(12) United States Patent
Kim

(10) Patent No.: US 12,511,429 B2
(45) Date of Patent: Dec. 30, 2025

(54) ELECTRONIC DEVICE FOR ANALYZING PERMISSION FOR INSTALLATION FILE AND METHOD OF OPERATING THE SAME

(71) Applicant: Samsung Electronics Co., Ltd., Suwon-si (KR)

(72) Inventor: Jungkon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 17/940,249

(22) Filed: Sep. 8, 2022

(65) Prior Publication Data

US 2023/0086654 A1 Mar. 23, 2023

Related U.S. Application Data

(63) Continuation of application No. PCT/KR2022/011344, filed on Aug. 2, 2022.

(30) Foreign Application Priority Data

Sep. 15, 2021 (KR) .................. 10-2021-0123423

(51) Int. Cl.
*G06F 21/62* (2013.01)
*G06F 8/61* (2018.01)
(Continued)

(52) U.S. Cl.
CPC ............ *G06F 21/6245* (2013.01); *G06F 8/61* (2013.01); *G06F 21/51* (2013.01); *G06F 21/57* (2013.01);
(Continued)

(58) Field of Classification Search
CPC ........ G06F 21/6245; G06F 8/61; G06F 21/51; G06F 21/57; G06F 2221/034; G06F 2221/2141; G06F 21/572
See application file for complete search history.

(56) References Cited

U.S. PATENT DOCUMENTS 9,202,049 B1 12/2015 Book et al.
9,953,158 B1 * 4/2018 Benameur ............... G06F 21/53
(Continued)

FOREIGN PATENT DOCUMENTS

CN 110598382 A 12/2019
JP 2013196310 A * 9/2013
(Continued)

OTHER PUBLICATIONS

International Search Report with Written Opinion and English translation dated Nov. 1, 2022; International Appln. No. PCT/KR2022/011344.
(Continued)

*Primary Examiner* — Joe Chacko
(74) *Attorney, Agent, or Firm* — Jefferson IP Law, LLP

(57) ABSTRACT

According to various embodiments, a method of performed by an electronic device may include identifying a first permission associated with a function included in an installation file of an application, and a first category of a role associated with the first permission, identifying a second category of the role associated with the first permission, based on a document associated with the application, and in case the first category is different from the second category, providing a notification. Various other embodiments are available.

18 Claims, 17 Drawing Sheets

(51) Int. Cl.
*G06F 21/51* (2013.01)
*G06F 21/57* (2013.01)

(52) U.S. Cl.
CPC ............... *G06F 2221/034* (2013.01); *G06F 2221/2141* (2013.01)

(56) References Cited

U.S. PATENT DOCUMENTS

| | | | |
|---|---|---|---|
| 10,339,315 B2 | 7/2019 | Park et al. | |
| 10,366,236 B2 | 7/2019 | Akiyama et al. | |
| 10,891,380 B1 | 1/2021 | Deshpande et al. | |
| 2008/0022370 A1* | 1/2008 | Beedubail | H04L 63/101 |
| | | | 726/4 |
| 2013/0055401 A1 | 2/2013 | Kim et al. | |
| 2013/0067577 A1* | 3/2013 | Turbin | G06F 21/562 |
| | | | 726/24 |
| 2013/0104118 A1* | 4/2013 | Somani | G06F 21/6218 |
| | | | 717/173 |
| 2015/0261515 A1* | 9/2015 | Somani | G06F 21/6218 |
| | | | 717/176 |
| 2015/0332049 A1 | 11/2015 | Chen et al. | |
| 2016/0063266 A1* | 3/2016 | Huang | G06F 21/51 |
| | | | 726/30 |
| 2017/0068810 A1* | 3/2017 | Yao | G06F 21/44 |
| 2018/0144132 A1 | 5/2018 | Wang et al. | |
| 2020/0034557 A1* | 1/2020 | Huang | G06F 8/61 |
| 2020/0285761 A1 | 9/2020 | Buck et al. | |

FOREIGN PATENT DOCUMENTS

| | | |
|---|---|---|
| KR | 10-2013-0116409 A | 10/2013 |
| KR | 10-2258915 B1 | 6/2021 |

OTHER PUBLICATIONS

Felt et al.; Android Permissions Demystified; CCS'11; ACM; Oct. 17-21, 2011; Chicago, Illinois.

Aafer et al.; Precise Android API Protection Mapping Derivation and Reasoning; Association for Computing Machinery; CCS'18; Oct. 15-19, 2018; Toronto, ON, Canada.

Au et al.; PScout: Analyzing the Android Permission Specification; CCS'12; ACM; Oct. 16-18, 2012; Raleigh, North Carolina.

* cited by examiner

ELECTRONIC DEVICE FOR ANALYZING PERMISSION FOR INSTALLATION FILE AND METHOD OF OPERATING THE SAME

CROSS-REFERENCE TO RELATED APPLICATION(S)

This application is a continuation application, claiming priority under § 365(c), of an International application No. PCT/KR2022/011344, filed on Aug. 2, 2022, which is based on and claims the benefit of a Korean patent application number 10-2021-0123423, filed on Sep. 15, 2021, in the Korean Intellectual Property Office, the disclosure of which is incorporated by reference herein in its entirety.

TECHNICAL FIELD

The disclosure relates to an electronic device for analyzing a permission for an installation file and a method of operating the same.

BACKGROUND ART

Portable digital communication devices have become a necessity for many people living these days. Consumers want to receive various desired high-quality services anytime, anywhere through portable digital communication devices.

Services may be provided by various types of applications installed in the portable digital communication devices. Along with diversification of services, the number of applications installed in communication devices is also rapidly increasing. As the number of applications increases, protection of personal information in the applications installed in the communication devices attracts increasing public attention, and more efforts are made to legally guarantee the protection of personal information at a national level.

Accordingly, in case an application developer collects sensitive information related to personal information, the application developer requests permission to collect sensitive information from the consumer. In this context, there is a desire for implementing a technology of evaluating whether an application collects sensitive information as notified to consumers and providing a notification of the collection of the sensitive information.

The above information is presented as background information only to assist with an understanding of the disclosure. No determination has been made, and no assertion is made, as to whether any of the above might be applicable as prior art with regard to the disclosure.

DISCLOSURE

Technical Problem

A developer may develop an application using a software development kit (SDK) at a specific level (e.g., at an application programming interface (API) level) and register the application in a server. The resulting generated installation file may include functions for performing functions and/or calling other functions. In case the application is installed and executed based on the installation file in a user's electronic device, the functions included in the installation file may collect and process sensitive information closely related to personal information stored in the electronic device. In case a specific permission corresponding to the sensitive information is granted based on the application in the electronic device, the functions may perform an operation to collect the sensitive information and process it for various purposes. It may be notified that the application may collect sensitive information by an electronic document describing the application, registered together with the installation file in the server. However, the application running on the electronic device may collect the sensitive information differently from the notice of the electronic document, thereby causing a problem in the protection of personal information.

Aspects of the disclosure are to address at least the above-mentioned problems and/or disadvantages and to provide at least the advantages described below.

According to aspects of the disclosure, an electronic device and a method of operating the same may enable development of an application that guarantees personal information protection and prevent leakage of personal information by performing an operation of comparing data of a permission analyzed from an installation file with data of the permission, notified in an electronic document and providing a notification related to the comparison.

Further, according to aspects of the disclosure, an electronic device and a method of operating the same may enable a developer or a user to more accurately analyze data uses of a permission of an application by generating a call flow graph for an installation file, identifying a role of a permission based on the call flow graph, and comparing the identified role of the permission with a role of the permission, notified in an electronic document.

Additional aspects will be set forth in part in the description which follows and, in part, will be apparent from the description, or may be learned by practice of the presented embodiments.

Technical Solution

According to various embodiments of the disclosure, a method of operating an electronic device may include identifying a first permission associated with a function included in an installation file of an application, and a first category of a role associated with the first permission, identifying a second category of the role associated with the first permission, based on a document associated with the application, and in case the first category is different from the second category, providing a notification.

According to various embodiments of the disclosure, an electronic device may include a memory and at least one processor. The at least one processor may be configured to identify a first permission associated with a function included in an installation file of an application, and a first category of a role associated with the first permission, identify a second category of the role associated with the first permission, based on a document associated with the application, and in case the first category is different from the second category, provide a notification.

According to various embodiments of the disclosure, a method of operating an electronic device may include receiving an installation file of an application from a server, identifying a first permission associated with a function included in the installation file, and a first category of a role associated with the first permission, obtaining an electronic document associated with the application from the server, identifying a second category of the role associated with the first permission, based on the electronic document, and in case the first category is different from the second category, providing a notification.

According to various embodiments of the disclosure, the technical solutions are not limited to the above-described solutions, and those skilled in the art will clearly understand solutions not mentioned from the specification and the accompanying drawings.

Advantageous Effects

According to various embodiments of the disclosure, an electronic device and a method of operating the same may be provided, which enable development of an application that guarantees personal information protection and prevent leakage of personal information by performing an operation of comparing data of a permission analyzed from an installation file with data of the permission, notified in an electronic document and providing a notification related to the comparison.

Further, according to various embodiments of the disclosure, an electronic device and a method of operating the same may be provided, which enable a developer or a user to more accurately analyze data uses of a permission of an application by generating a call flow graph for an installation file, identifying a role of a permission based on the call flow graph, and comparing the identified role of the permission with the role of the permission, notified in an electronic document.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
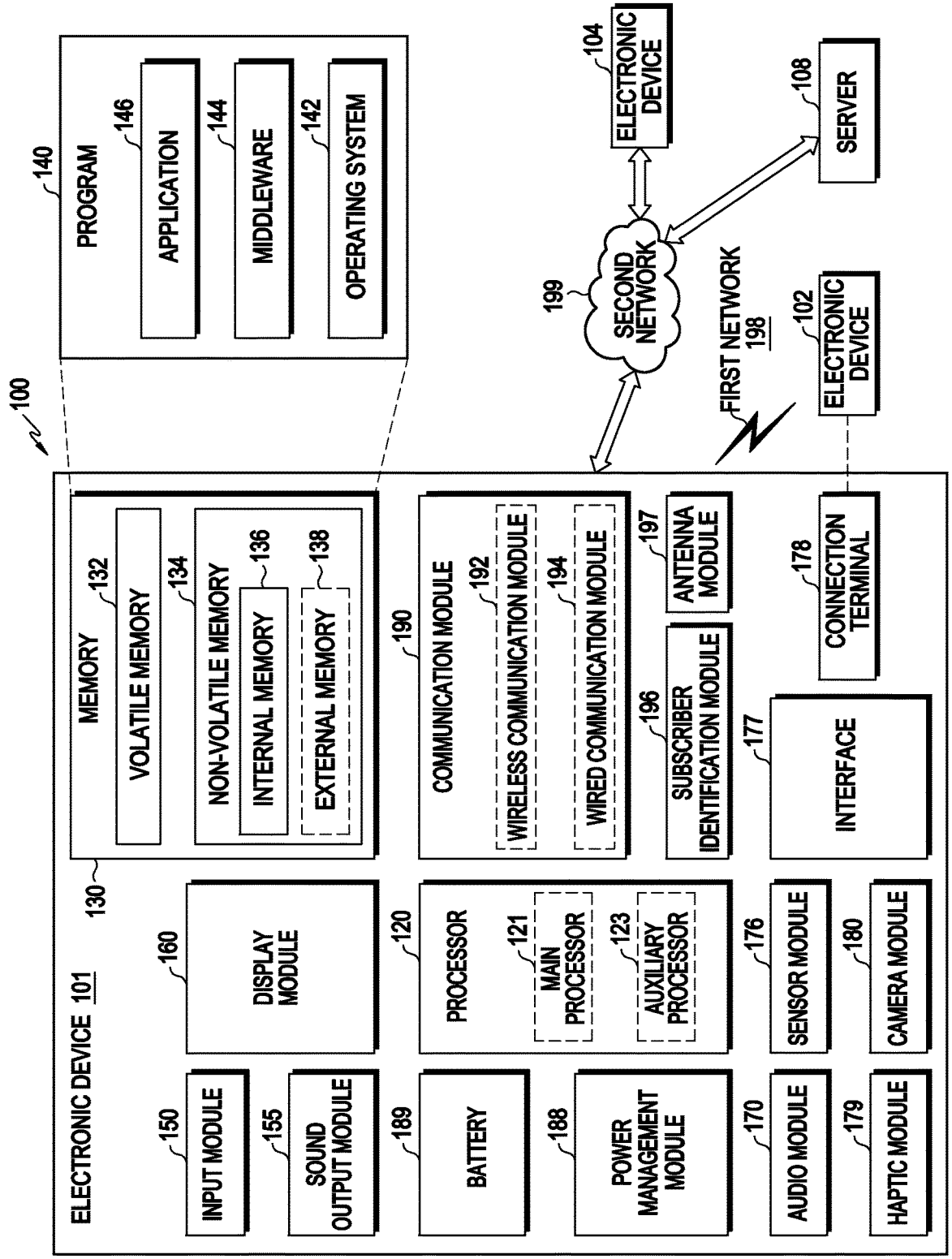
FIG. 1 is a block diagram illustrating an electronic device in a network environment according to various embodiments of the disclosure.

FIG. 1 is a block diagram illustrating an electronic device 101 in a network environment 100 according to various embodiments of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Exemplary configurations of electronic devices (e.g., a user device 220 and a server 210 (or an external electronic device)) according to various embodiments will be described below. The user device 220 and/or the server 210 described below may be implemented identically to the electronic device 101 described before with reference to FIG. 1, and thus a redundant description will be avoided.

Figure 2:
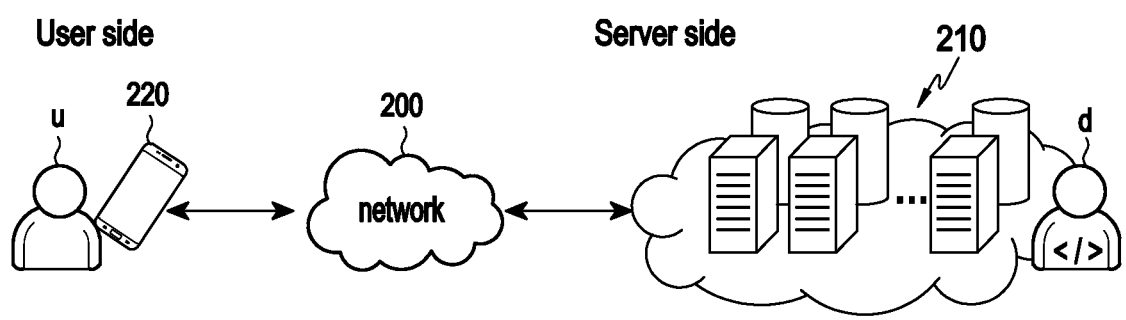
FIG. 2 is a diagram illustrating an example of electronic device according to various embodiments of the disclosure.

FIG. 2 is a diagram illustrating an example of electronic devices according to various embodiments of the disclosure. However, more electronic devices may be implemented in an environment according to various embodiments, not limited to the electronic devices illustrated in FIG. 2.

According to various embodiments, referring to FIG. 2, the electronic devices may include the user device 220 and the server 210. The electronic devices (e.g., the user device 220 and the server 210) may establish a communication connection and transmit and/or receive information to and/or from each other through a network 200. For example, the communication connection may be established through the network 200 based on a communication connection scheme (3rd generation (3G), 4th generation (4G)/long term evolution (LTE), and 5th generation (5G)) based on cellular communication using a base station (BS), a communication scheme (e.g., wireless fidelity (Wi-Fi) communication) using an access point (AP), and/or a communication scheme (not shown) for establishing a direct communication connection (e.g., Wi-Fi direct and Bluetooth). However, the communication connection may be established based on a wired communication connection scheme, not limited to the above communication schemes.

According to various embodiments, the server 210 may provide an installation file (or installation code) of an application (or program) and/or a related electronic document to the user device 220. For example, the server 210, which is a server of a developer d who develops (or produces or generates) an application (or program), may be an integrated server 210 implemented to distribute the installation file of the application (or program). The distribution may refer to application search and/or application download. Alternatively, the server 210 may be implemented in a form including a development server for the developer d, for development, and a distribution server implemented to distribute an application (or program), instead of the integrated server 210 in which the development and distribution of the application (or program) are performed together. The developer d may develop an application (or program) on the server 210, generate an installation file (e.g., an Android application package (APK) file or an IOS app store package (IPA) file) for installation of the application (or the program), and write a document for describing the application (or program) corresponding to the installation file (e.g., a document about a privacy policy or a distribution document related to the application). In case of developing an application based on Android OS, the developer d may develop an application at a specific API level and/or an application targeting an SDK of a specific version. An installation file generated according to the development of the application may include codes (or instructions) (custom functions described later) defined as functions. Upon execution of the installation file (or application), the custom functions may collect data by using OS functions (or system functions) and end-point functions, and process the collected data for specific roles. An OS function may be defined as a function (e.g., Android API) provided by the OS (e.g., Android OS) of the user device 220. An end-point function, which is a function (e.g., end-point API) provided from a library (e.g., structured query language (SQL)), may be defined as a function implemented to process data (e.g., data of a specific permission type) obtained by the OS function. The installation file and document generated by the developer d may be uploaded to the server 210 (or transmitted and uploaded from the development server to the distribution server). In case the user device 220 accesses the server 210 (or the distribution server), the server 210 (or the distribution server) may transmit at least one registered installation file and document to the user device 220. A user u may identify the types of permissions (e.g., location, contact, microphone, sensor, storage, short message service (SMS), and calendar) required for operations of the application (or program), and the roles (e.g., utilization, storage, collection, and transmission/sharing) of the permissions, based on the document.

According to various embodiments, a permission may be a kind of parameter that enables the application to collect data (e.g., personal identifiable information (PII)) corresponding to the permission from information stored in an electronic device in which the application is installed. The type of the permission may include, but not limited to, at least one of location, contact, microphone, sensor, storage, SMS, or calendar. For example, after the application is installed in the user device 220, the installed application may be implemented to display a screen for inquiring of the user u whether to grant at least one permission in the user device 220. In case the inquired permission is granted in the user device 220, the executed application may collect and process data (e.g., global positioning system (GPS) information about the user device 220 associated with a location permission) corresponding to the granted permission (e.g., location). For example, the application may call an OS function (or system function), obtain (or collect) data corresponding to the granted permission based on the called OS function, and process the obtained data for a specific role by using an end-point function. Since the types of permissions other than the described example and the types of data (e.g., PII) collected according to specific permissions granted by the user u are well known, a more detailed description thereof will be avoided. Data collected according to a granted permission may be defined as sensitive data.

According to various embodiments, the role of a permission means the role (or use) of data collected according to the granted permission, and may be a kind of category as which the permission required by the installation file (or application) is classified. Alternatively, the role of the permission may be understood as a term such as an attribute, a parameter, or a characteristic, instead of a category. For example, the category of the role may include utilization, storage in the user device 220, collection by the server 210, and transmission/sharing. However, permissions may be classified into more categories, not limited to the description. For example, in case data (e.g., GPS information) collected according to a granted location permission are used to drive an application, the location permission may be classified as the utilization category. Further, for example, in case data (e.g., contact information) collected according to a granted contact permission is stored in the user device 220, the contact permission may be classified as the storage category. That is, as permissions are classified into the categories of roles, uses of sensitive data collected by an application according to a granted permission may be analyzed more precisely. As described later, the server 210 (or the user device 220) may compare a user of a permission analyzed from the installation file with a use of the permission analyzed from the electronic document, and accordingly provide a specific notification according to a result of the comparison, which will be described later.

According to various embodiments, the user device 220 may receive an installation file and/or a document for an application (or program) from the server 210. For example, the user device 220 may access the server 210 (or the distribution server) based on execution of an application for accessing the server 210 (or the distribution server). An execution screen of the executed application may include a text field for receiving a search word. Based on reception of a text input of the user u through the text field, the user device 220 may transmit a search query including the input text to the server 210 (or the distribution server), and receive at least one installation file and at least one document corresponding to the search query among a plurality of installation files 331 and a plurality of documents 333 stored in the server 210 from the server 210 (or the distribution server).

According to various embodiments, the server 210 and/or the user device 220 may evaluate whether the installation file corresponding to the application uses a permission of a specific type according to the role of data of the permission of the specific type, described in the document for the application, and provide a result of the evaluation, which will be described later.

An exemplary configuration of the server 210 according to various embodiments will be described below.

Figure 3A:
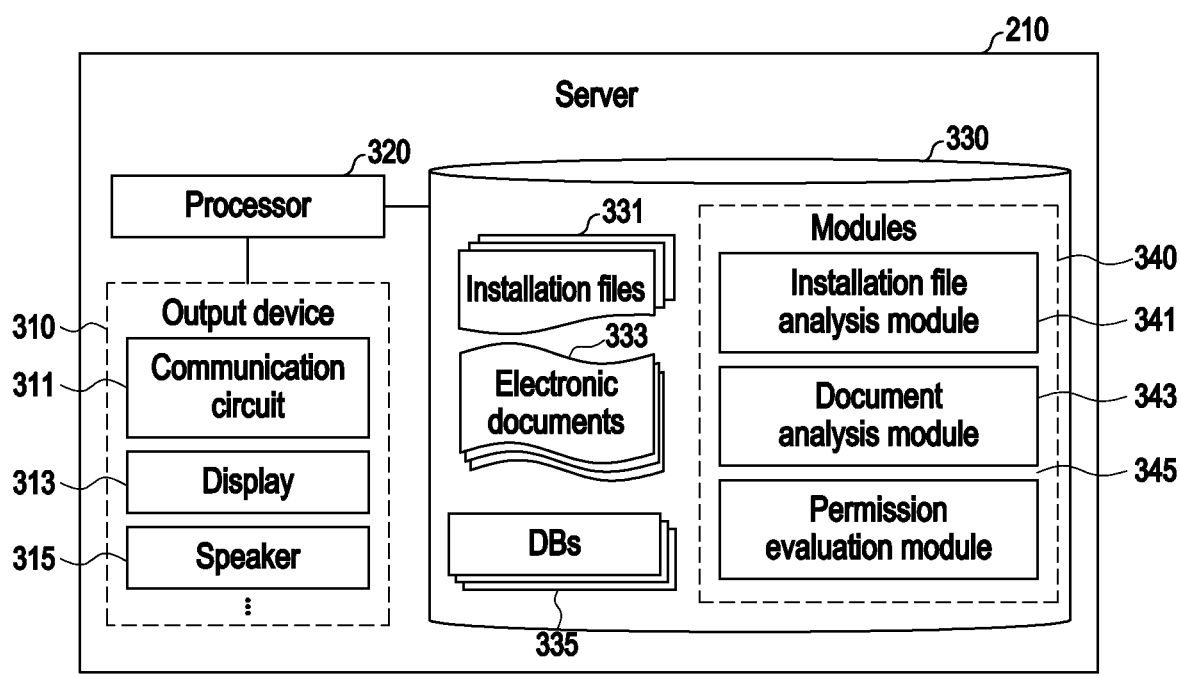
FIG. 3A is a block diagram illustrating an exemplary configuration of a server according to various embodiments of the disclosure.

FIG. 3A is a block diagram illustrating an exemplary configuration of the server 210 according to various embodiments of the disclosure. The server 210 may be implemented to include more or fewer devices, not limited to the components illustrated in FIG. 3A. FIG. 3A will be described below with reference to FIGS. 3B and 3C.

Figure 3B:
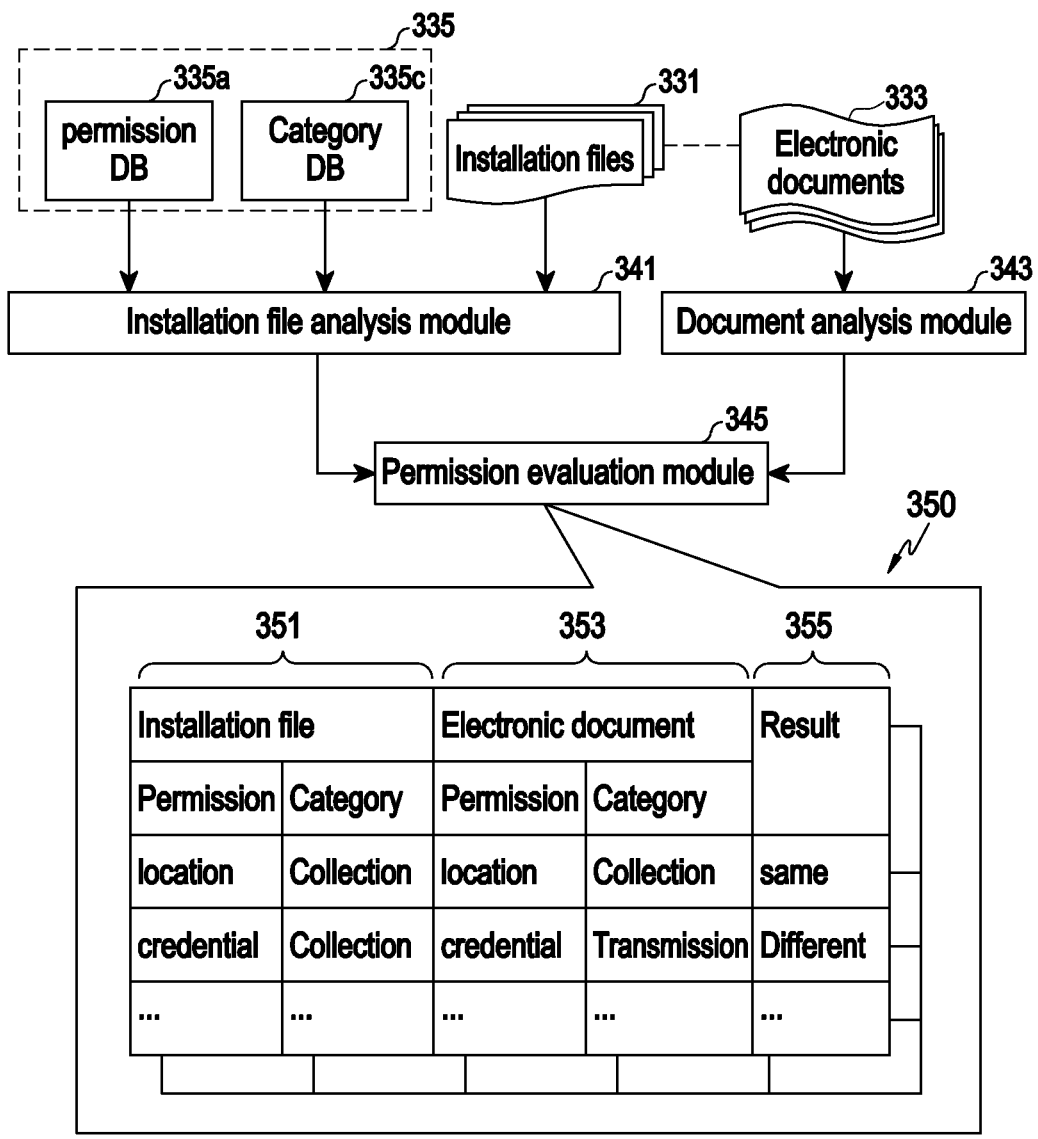
FIG. 3B is a diagram illustrating an exemplary operation of evaluating roles of permissions for an installation file in a server according to various embodiments of the disclosure.
Figure 3C:
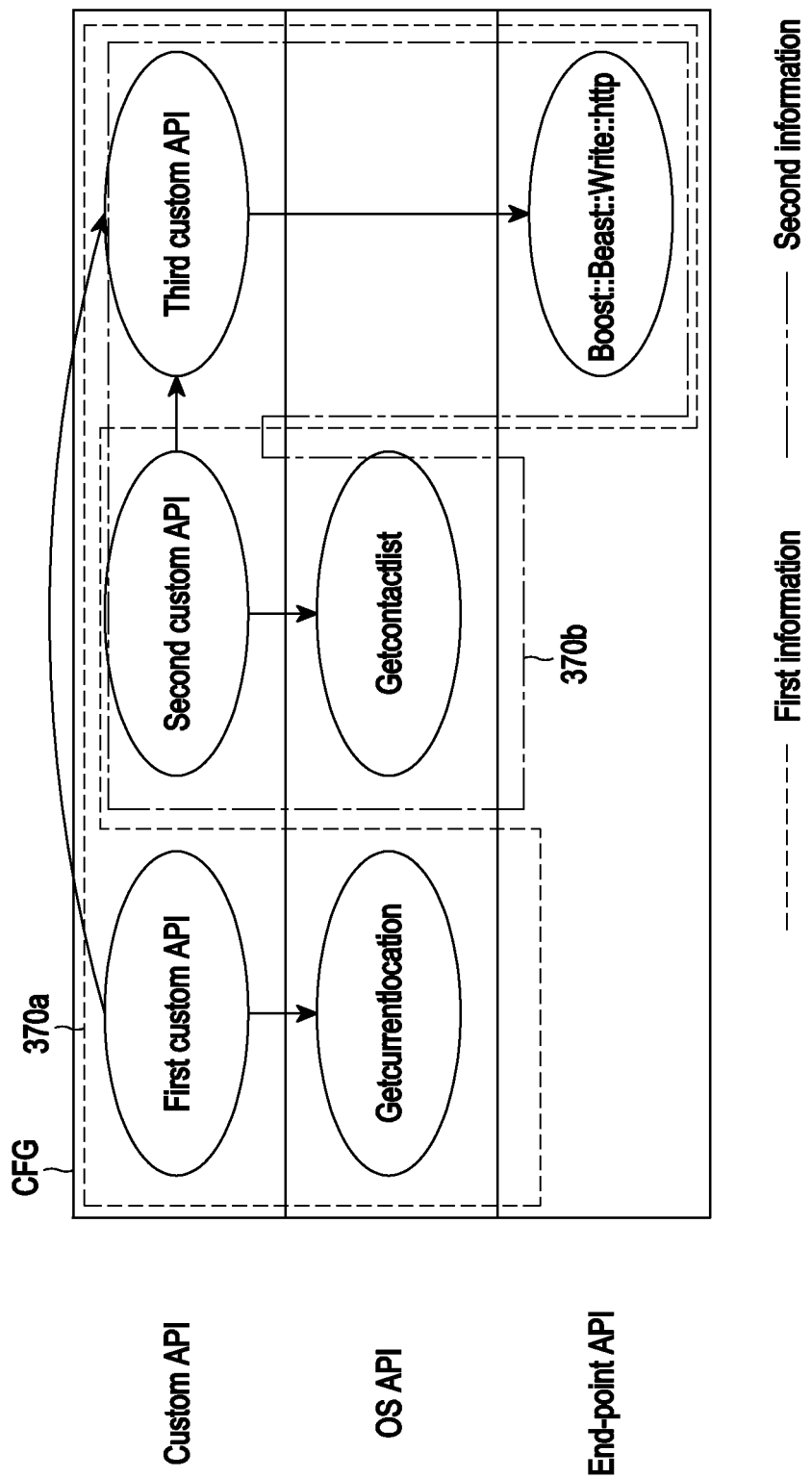
FIG. 3C is a diagram illustrating a call flow graph for an installation file according to various embodiments of the disclosure.

FIG. 3B is a diagram illustrating an exemplary operation of evaluating the role of a permission of an installation file in the server 210 according to various embodiments of the disclosure. FIG. 3C is a diagram illustrating an exemplary call flow graph (CFG) for an installation file according to various embodiments of the disclosure.

According to various embodiments, referring to FIG. 3A, the server 210 may include an output device 310 including a communication circuit 311, a display 313, and a speaker 315, a storage device 330 that stores the installation files 331, the electronic documents 333, databases (DBs) 335, and modules 340 (e.g., an installation file analysis module 341, a document analysis module 343, and a permission evaluation module 345), and a processor 320.

Operations of the processor 320 described below may be performed according to execution of the stored modules 340 (e.g., the installation file analysis module 341, the document analysis module 343, and the permission evaluation module 345). At least some of the stored modules 340 (e.g., the installation file analysis module 341, the document analysis module 343, and the permission evaluation module 345) may be implemented (e.g., executed) in software, firmware, or a combination of at least two of software and firmware. For example, the modules 340 may be implemented in the form of an application, a program, computer code, instructions, a routine, or a process executable by the processor 320. Accordingly, in case the modules 340 (e.g., the installation file analysis module 341, the document analysis module 343, and the permission evaluation module 345) are executed by the processor 320, the modules 340 may cause the processor 320 to perform an operation associated with the modules 340 (or a function that the modules 340 are capable of providing). Therefore, in case it is described that a specific module performs an operation in the following description, it may be understood that the processor 320 performs an operation corresponding to the specific module as the specific module is executed. Alternatively, the modules 340 (e.g., the installation file analysis module 341, the document analysis module 343, and the permission evaluation module 345) may be implemented as a part of a specific application. Alternatively, each of the modules 340 may be implemented in hardware (e.g., as a processor or a control circuit) separate from the processor 320, not limited to the description and/or the illustration. At least some of the operations of the modules 340 described below may be implemented as separate modules instead of a corresponding module. For example, some of the operations of the installation file analysis module 341 described below may be implemented as a first module (e.g., a first program), and the other operations may be implemented as a second module (e.g., a second program).

According to various embodiments, all of the modules 340 (e.g., the installation file analysis module 341, the document analysis module 343, and the permission evaluation module 345) may be implemented in the user device 220, instead of the server 210, not limited to the illustration of FIG. 3A. In this case, the user device 220 may be defined as an on-device type electronic device. Accordingly, as the modules 340 (e.g., the installation file analysis module 341, the document analysis module 343, and the permission evaluation module 345) are executed in the user device 220, the user device 220) may perform operations corresponding to the modules 340. Without being limited to the description, the electronic devices (e.g., the server 210 and the user device 220) may be implemented as a hybrid type in which some of the modules 340 (e.g., the installation file analysis module 341, the document analysis module 343, and the permission evaluation module 345) are implemented in the server 210, and the other part of the modules 340 (e.g., the installation file analysis module 341, the document analysis module 343, and the permission evaluation module 345) are implemented in the user device 220. For example, the installation file analysis module 341 and the document analysis module 343 may be implemented in the server 210, and the permission evaluation module 345 may be implemented in the user device 220. Information analyzed by the modules 340 (e.g., the installation file analysis module 341 and the document analysis module 343) may be transmitted from the server 210 to the user device 220, and the user device 220 may perform an operation corresponding to the permission evaluation module 345.

Each component included in the electronic device 101 will be described below.

First, an example of the output device 310 according to various embodiments will be described. The output device 310 may output information (e.g., a notification, a warning, or a screen) generated according to a result of an evaluation performed by the permission evaluation module 345 as described later. The information may be provided as a type of content recognizable by the user u and/or the developer d, such as visual content, auditory content, or tactile content. The developer d and/or the user u may identify information associated with a permission of an installation file (e.g., information indicating whether roles of a specific permission are the same, or information about a risk level of an application) based on the information received from the output device 310. While the output device 310 has been described as including the communication circuit 311, the display 313, and the speaker 315, the output device 310 may include more types of output devices, not limited to the illustration and/or the description.

According to various embodiments, the communication circuit 311 may establish a communication connection with an external electronic device (e.g., the user device 220) and transmit and/or receive data to and/or from the external electronic device through various types of communication schemes. As described before, the communication schemes may include, but not limited to, a communication scheme for establishing a direct communication connection such as Bluetooth and Wi-Fi direct, and may include a communication scheme using an AP (e.g., Wi-Fi communication) or a communication scheme (e.g., 3G, 4G/LTE, 5G) based on cellular communication using a BS. The communication circuit 311 may be implemented as the communication module 190 described before with reference to FIG. 1, and thus a redundant description will be avoided. For example, the server 210 may provide a screen including a search result for an application, which includes information obtained based on an operation of the permission evaluation module 345 through the communication circuit 311 (e.g., information indicating whether roles of a specific permission are identical or information indicating a risk level of the application) to the user device 220.

According to various embodiments, the display 313 may be implemented identical to the display module 160 described before with reference to FIG. 1, and thus a redundant description will be avoided. The server 210 may obtain (or generate) a screen including the information obtained based on the operation of the permission evaluation module 345 (e.g., the information indicating whether the roles of the specific permission are identical or the information indicating the risk level of the application) and display the obtained screen on the display 313.

According to various embodiments, the speaker 315 may be implemented identically to the speaker module described before with reference to FIG. 1, and thus a redundant description will be avoided. The server 210 may convert the information obtained based on the operation of the permission evaluation module 345 (e.g., the information indicating whether the roles of the specific permission are identical or the information indicating the risk level of the application) into an audio and output the converted audio through the speaker 315.

An example of the installation files 331 and the electronic documents 333 stored in the storage device 330 according to various embodiments will be described below. The storage device 330 may include a large-capacity memory or DB.

An example of the installation files 331 according to various embodiments will first be described.

According to various embodiments, the installation files 331 may be files for installing applications (or programs) developed by the developer d. For example, the installation files 331 may include an APK file and an IPA file. The installation files 331 may be generated by the developer d and uploaded to the server 210 (or the distribution server). The developer d may develop an application at a specific API level and/or based on an SDK of a specific version. In case the user device 220 opens (or decompresses) a downloaded (or received) installation file 331, an application (or program) included in the installation file 331 may be installed (or decompressed) in the user device 220, and functions provided by application (or program) may be performed.

According to various embodiments, an installation file 331 (or application) generated by the developer d may include at least one function. The function may be codes (or instructions) implemented to perform a specific function or to call other functions (e.g., OS functions). For example, the function may include an API. In this case, codes (or instructions) that are the function included in the installation file 331 (or application) may be referred to as custom functions (e.g., custom APIs). As the application is executed, a custom function (e.g., custom API) sequentially calls other functions (e.g., other APIs), and thus perform an operation of processing collected (or obtained) data based on a finally called end-point function (e.g., end-point API). For example, the custom function (e.g., custom API) may call an OS function (or system function) (hereinafter, referred to as an OS API (or system API) (e.g., Android API)) provided by the OS (e.g., Android OS) of the user device 220. The custom function (e.g. custom API) may obtain (or collect) data corresponding to a specific permission by using the called OS function (e.g., Android API). The custom function may sequentially call other custom functions, and process the obtained (or collected) data corresponding to the specific permission for a specific role (e.g., utilization, storage, collection, or transmission/sharing) by using the finally called end-point function (e.g., end-point API). The end-point function (e.g., end-point API) is a function (e.g., API) provided by an afore-described library (e.g., a boost library or an SQL library), which may be implemented to process the data for the above-mentioned role (e.g., utilization, storage, or collection). As described later, the server 210 (e.g., the installation file analysis module 341) may generate a CFG for the installation file 331, and identify an end-point function (e.g., end-point API) corresponding to an OS function (e.g., Android API) called by a function (e.g., custom API). Further, the server 210 may identify the type of a permission, corresponding to the OS function (e.g., Android API) and the role of the permission, corresponding to the end-point function (e.g., end-point API), which will be described later.

An example of the electronic documents 333 according to various embodiments will be described below.

According to various embodiments, the electronic documents 333 may include text associated with a personal protection policy for specific installation files (or specific applications). For example, the electronic documents 333 are electronic documents created by the developer d who developed the applications (or programs), and include a document about the privacy policy and a distribution document related to the application. The document may be uploaded to the server 210 (or the distribution server) and provided together with a detected application, in case the user u searches for the application. Further, for example, the document is a legal document including regulations for protecting the privacy and personal information of the user u, and may include, for example, a general data protection regulation (GDPR) document of the European Union. The legal document may be pre-stored in the server 210, or the server 210 (e.g., the document analysis module 343) may access another external electronic device in which the legal document is stored, to obtain the legal document.

An example of the DBs 335 according to various embodiments will be described.

According to various embodiments, the DBs 335 may be a collection of information including preconfigured referenceable information to identify a type of a permission required by an installation file 331 (or application) and the role of the permission. Referring to FIG. 3B, the DBs 335 may include a permission DB 335a and a category DB 335c. The term DB may be replaced with library, file, look-up table, data set, or information set. The permission DB 335a and the category DB 335c may be implemented as a single integrated DB, not limited to the illustration and/or the description.

According to various embodiments, the permission DB 335a may include information about the type of a permission corresponding to an OS function (e.g., Android API) called by custom data (e.g., a custom API) included in (or compressed into) an installation file. According to an embodiment, for example, [Table 1] below may illustrate an example of the permission DB 335a including information about the type of a permission for each Android API executed on Android OS. Referring to [Table 1], information about the type of a permission required by an Android API at each API level may be included. For example, the permission DB 335a may be implemented based on analysis of an Android OS-related document including information about the type of a specific permission required by a specific Android API at each API level, which is known to those skilled in the art (or which is well-known), and pre-stored in the server 210. Further, in an embodiment, the permission DB 334a may be implemented to include information about the type of a permission for each function executed on IOS.

TABLE 1

| API level | Example of Android API | Permission type |
|---|---|---|
| 29 | getCurrentlocation | location |
| 29 | getContactList | contact |
| ... | ... | ... |

According to various embodiments, the category DB 335c may include information about the role of a permission corresponding to each end-point function (e.g., end-point API). According to an embodiment, for example, Table 2 below may illustrate an example of the category DB 335c including information about the role of a permission for each end-point API executed on Android OS. For example, the category DB 335c may be implemented based on analysis of a document describing an end-point API written by a well-known documentation generator (e.g., Doxygen) and pre-stored in the server 210. The analysis may be performed based on a natural language processing (NLP) algorithm of a document editing module to be described later. For example, the role of a permission, corresponding to boost::beast::http::write( . . . ) may be analyzed into a specific category (e.g., transmission) among a plurality of categories through analysis of the text of a document describing APIs included in a boost library based on the NLP algorithm by the server 210.

TABLE 2

| Example of end-point API | Role (category) of permission |
|---|---|
| boost::beast::http::write(...) | transmission |
| SQLiteDatabase.insert(...) | storage |
| FirebaseDatabase.getInstance( ).getReferencesetValue(...) | collection |

A description will be given below of the processor 320 according to various embodiments. According to various embodiments, the processor 320 may include at least one of an AP, a CPU, a GPU, a display processing unit (DPU), or a neural processing unit (NPU). As described above, as the modules 340 (e.g., the installation file analysis module 341, the document analysis module 343, and the permission evaluation module 345) are executed, the processor 320 may perform operations corresponding to the modules 340. An exemplary operation of the processor 320 upon execution of the modules 340 according to various embodiments will be described with reference to FIG. 3B. According to various embodiments, the installation file analysis module 341 may identify information about a permission corresponding to an installation file 331 (e.g., the type and role of a permission required by an application (or program)) based on static analysis of the installation file 331. The static analysis may refer to analyzing codes (or instructions) included in the installation file 331 in an environment in which the installation file 331 (or application) is not executed. Accordingly, as the installation file 331 (or the application) is executed, a problem of the developed installation file 331 (or the application) may be predicted before the problem (e.g., a security problem such as leakage of personal information) occurs. For example, the installation file analysis module 341 may de-compile and statically analyze the installation file 331, and as a result, identify the type of a permission for data obtained (or collected) by the application (or program) corresponding to the installation file 331, and the role of the obtained data. For example, the installation file analysis module 341 may identify a CFG representing functions (e.g., an OS function and an end-point function) called by a custom function (e.g., custom API) included in the installation file 331, and identify the type of a permission for collected (obtained) data collected (or obtained) and the role of the collected data, based on the identified CFG. The operation of identifying the type of a permission and the role of the permission based on the CFG in the installation file analysis module 341 may be performed based on the above-described pre-implemented DBs 335 (e.g., the permission DB 335a and the category DB 335c), which will be further described later with reference to FIG. 5A.

According to various embodiments, as illustrated in FIG. 3C, a CFG generated as a result of static analysis by the installation file analysis module 341 may include information about a call relationship (or call flow) among a plurality of custom functions (e.g., custom APIs) included in an installation file and information about OS functions and/or end-point functions called by the plurality of custom functions. For example, the CFG may include information about an OS function that a specific custom function calls and an end-point function which is finally called as the specific custom function sequentially calls at least one other custom function. Further, for example, the CFG may represent a specific end-point function, and OS functions called by at least some of custom functions that have called the specific end-point function. For example, referring to FIG. 3C, the CFG may represent a call relationship 370a in which a first custom API calls a first OS API (e.g., Getcurrentlocation), calls a third custom API, and finally calls an end-point API (e.g., boost::beast::write::http). In another example, referring to FIG. 3C, the CFG may represent a call relationship 370b in which a second custom API calls a second OS API (e.g., Getcontactlist), calls the third custom API, and finally calls the end-point API (e.g., boost::beast::write::http). The installation file analysis module 341 may identify the type and role of a permission required by the installation file, based on the CFG, which will be described later with reference to FIG. 5A. While the CFG has been described as a single CFG for convenience of description, the CFG may conceptually include a plurality of CFGs. For example, the server 210 may perform a first operation of generating a first CFG representing an end-point function finally called according to sequential calls between custom functions, and a second operation of generating a second CFG representing an OS function called by custom functions. The server 210 may perform an operation of identifying the type of a permission or an operation of identifying the role of the permission, based on one of the CFGs generated by each of the operations (e.g., the first operation and the second operation). However, the server 210 may generate a single CFG, not limited to the description.

Without being limited to the description, the installation file analysis module 341 according to various embodiments may identify information about a permission corresponding to an installation file (e.g., the type of the permission and the role of the permission) based on dynamic analysis of the installation file. For example, the installation file analysis module 341 may trace (or log) a call and a response for a function during execution of an application based on in-the-box analysis or out-of-the-box analysis, and identify the type of a permission and the role of the permission based on a result of the tracing. In this case, the permission evaluation module 345 described later may compare information about the permission analyzed dynamically (e.g., the type and role of the permission) with information about the permission analyzed from an electronic document (e.g., the type and role of the permission).

According to various embodiments, the document analysis module 343 may identify information about a permission (e.g., the type of the permission and the role of the permission) notified as required by an electronic document based on analysis of the electronic document. For example, the document analysis module 343 may identify the type of the permission and the role of the permission based on analysis of text included in the electronic document based on an NLP algorithm. The NLP algorithm may include at least one of a natural language analysis algorithm, a natural language understanding algorithm, or a natural language generation algorithm. An artificial intelligence model (e.g., a deep learning model or a machine learning model) for performing the NLP algorithm may be pre-implemented and pre-stored in the server 210. The artificial intelligence model may be implemented to output information about the type of the permission and information about the role of the permission in response to reception of values (e.g., matrix values) corresponding to the text obtained from the electronic document. Accordingly, the document analysis module 343 may obtain the type of the permission and the role of the permission associated with the electronic document (or notified by the electronic document) based on the text obtained from the artificial intelligence model and the electronic document. An example of the operation of the document analysis module 343 will be further described later with reference to FIG. 5B.

According to various embodiments, the permission evaluation module 345 may compare information 351 about permissions, identified based on an installation file with information 353 about the permissions, identified based on an electronic document, and obtain information 355 about a result of the comparison. The permission evaluation module 345 may obtain information 350 about the types of the permissions and the roles of the permissions from the installation file analysis module 341 and the document analysis module 343. The permission evaluation module 345 may compare a first role of a permission of a specific type, identified based on the installation file with a second role of the permission of the specific type, identified based on the electronic document, as illustrated in FIG. 3B. The information about the comparison result may indicate whether the roles (e.g., the first role and the second role) of the permission correspond to each other (e.g., whether they are the same) or are different from each other. As described later with reference to FIGS. 4, 5A, 5B, 6A and 6B, the permission evaluation module 345 may provide a notification to the developer d or the user u based on the information about the comparison result obtained by the server 210 (or the user device 220).

An exemplary operation of the server 210 according to various embodiments will be described below. As described above, in case the user device 220 is implemented as an on-device type, the operations of the server 210 described below may be performed in the user device 220, or in case the user device 220 and the server 210 are implemented as a hybrid type, some of the operations of the server 210 described below may be performed in the server 210, and the other operations of the server 210 may be performed in the user device 220.

According to various embodiments, the server 210 may perform an operation of providing a notification of a comparison result to the developer d or the user u through the output device 310 (e.g., the communication circuit 311, the display 313, and the speaker 315) based on a comparison between information about a permission (e.g., the type of the permission and the role of the permission), identified from an installation file 331 for installing an application (or program) and information about the permission (e.g., the type of the permission and the role of the permission), identified from an electronic document 333 related to the application (or program).

Figure 4:
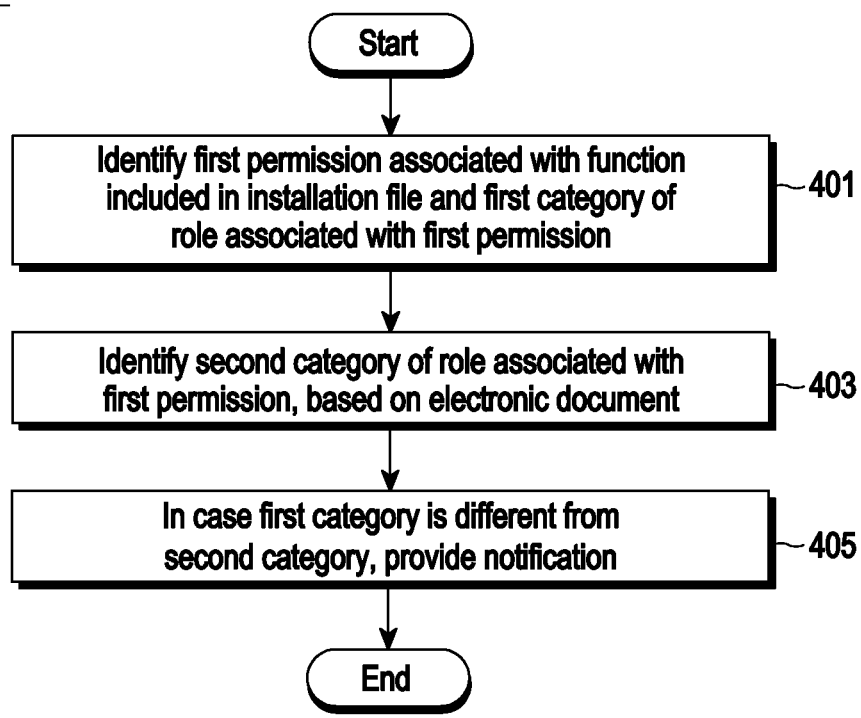
FIG. 4 is a flowchart 400 illustrating an exemplary operation of a server according to various embodiments of the disclosure.

FIG. 4 is a flowchart 400 illustrating an exemplary operation of the server 210 according to various embodiments of the disclosure. The operations illustrated in FIG. 4 may be performed in various orders, not limited to the illustrated order. Further, according to various embodiments, more operations than those or at least one operation fewer than those illustrated in FIG. 4 may be performed. FIG. 4 will be described with reference to FIGS. 5A, 5B, 6A and 6B.

Figure 5A:
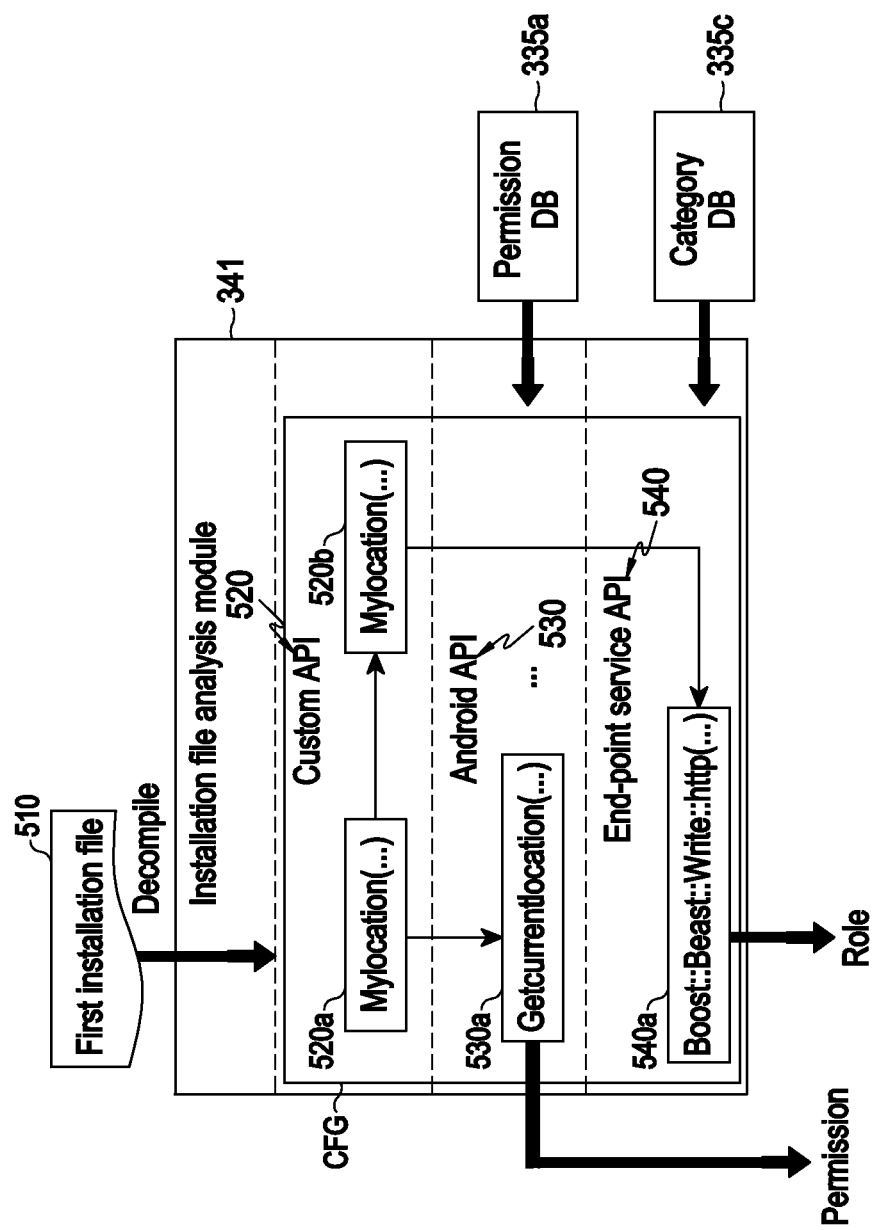
FIG. 5A is a diagram illustrating an exemplary operation of identifying the type of a permission and the role of the permission, associated with an installation file in a server (e.g., a file analysis module) according to various embodiments of the disclosure.
Figure 5B:
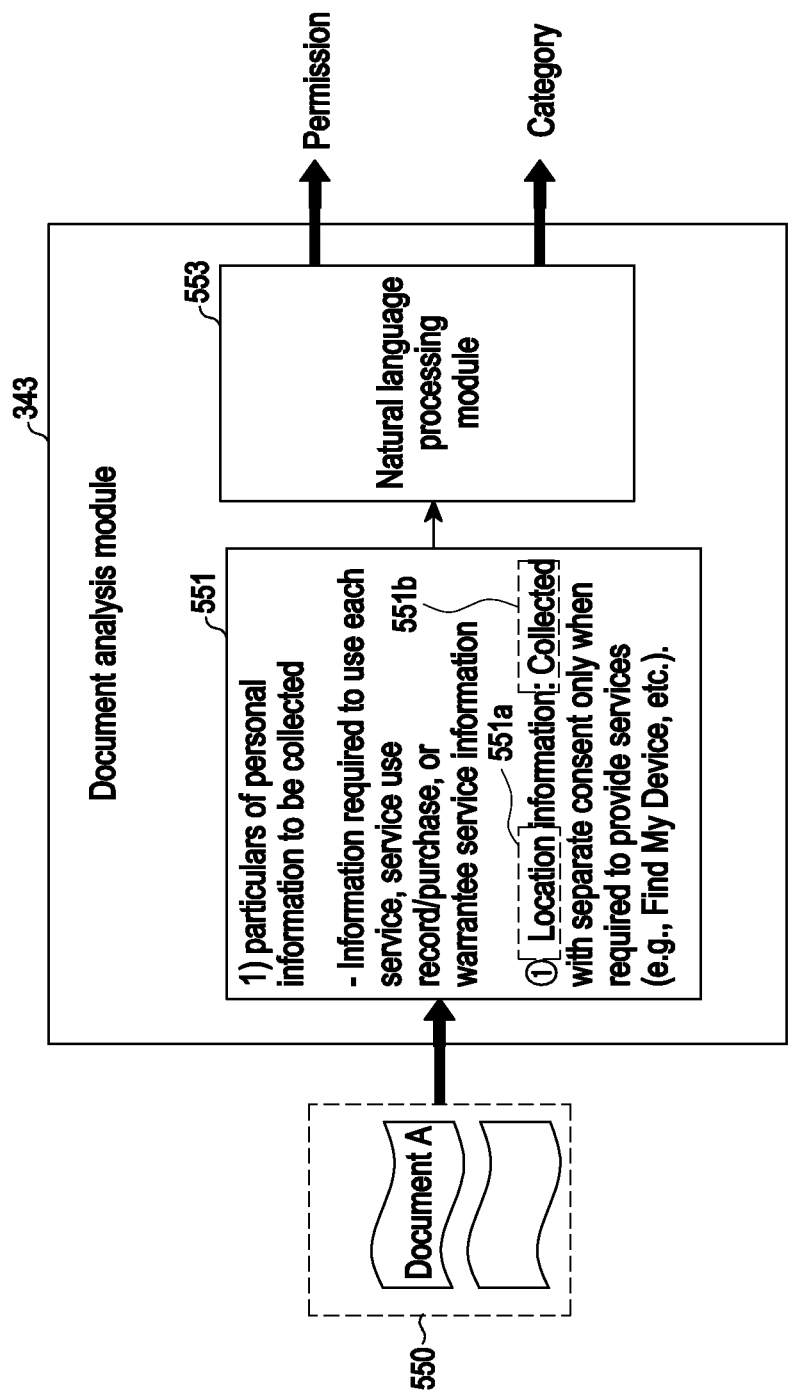
FIG. 5B is a diagram illustrating an exemplary operation of identifying the type of a permission and the role of the permission, associated with an electronic document in a server (e.g., a document analysis module) according to various embodiments of the disclosure.
Figure 6A:
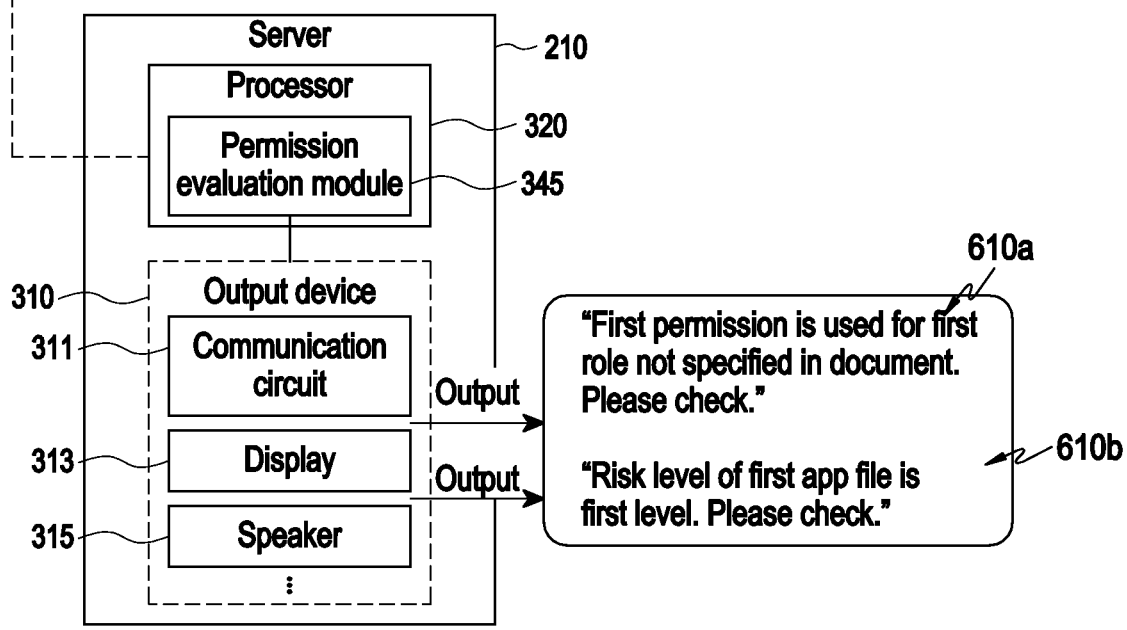
FIG. 6A is a diagram illustrating an exemplary operation of providing a notification based on a comparison operation in a server (e.g., a permission evaluation module) according to various embodiments of the disclosure.
Figure 6B:
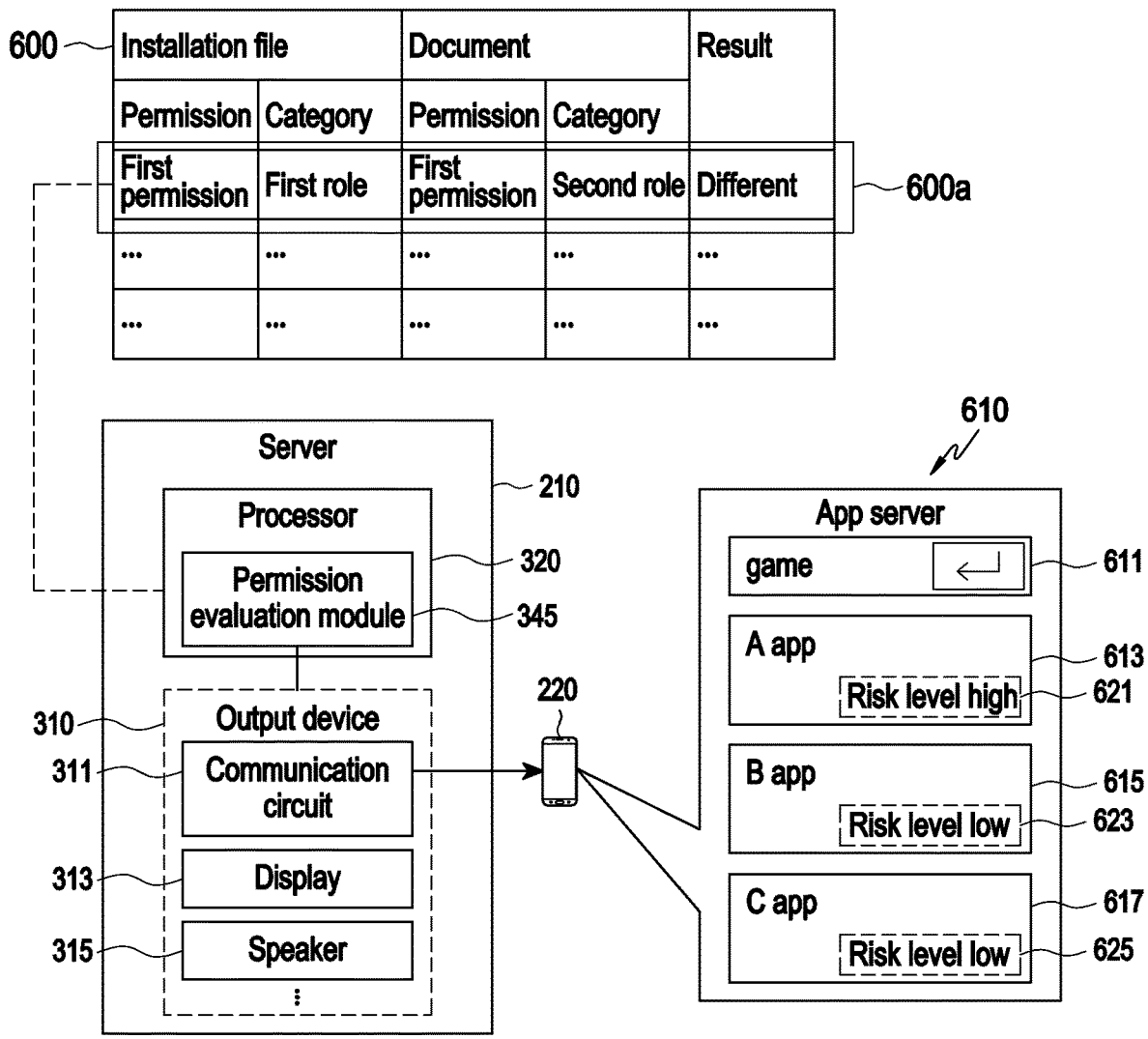
FIG. 6B is a diagram illustrating another exemplary operation of providing a notification based on a comparison operation in a server (e.g., a permission evaluation module) according to various embodiments of the disclosure.

FIG. 5A is a diagram illustrating an exemplary operation of identifying the type of a permission and the role of the permission, associated with an installation file in the server 210 (e.g., the file analysis module) according to various embodiments of the disclosure. FIG. 5B is a diagram illustrating an exemplary operation of identifying the type of a permission and the role of the permission, associated with an electronic document in the server 210 (e.g., the document analysis module) according to various embodiments of the disclosure. FIG. 6A is a diagram illustrating an exemplary operation of providing a notification based on a comparison operation in the server 210 (e.g., the permission evaluation module) according to various embodiments of the disclosure. FIG. 6B is a diagram illustrating another exemplary operation of providing a notification based on a comparison operation in the server 210 (e.g., the permission evaluation module) according to various embodiments of the disclosure.

According to various embodiments, in operation 401, the server 210 may identify a first permission associated with a function included in an installation file of an application, and a first category of a role associated with the first permission. The server 210 (e.g., the installation file analysis module 341) may identify an installation file (e.g., a first installation file 510) to be evaluated among a plurality of installation files 331 corresponding to a plurality of applications (or a plurality of programs) stored in the server 210. The first installation file 510 may include (or compress) codes (or instructions) for a first application, written by the developer d. The installation file analysis module 341 may obtain information about a permission (e.g., the type and role of a permission) associated with the installation file (e.g., the first installation file 510) based on static analysis of the installation file. For example, the installation file analysis module 341 may identify the type and role of the permission associated with the installation file (a permission identified as required by the installation file) based on a CFG for the installation file (e.g., the first installation file 510) and the DBs 335 (e.g., the permission DB 335*a* and the category DB 335*c*), as illustrated in FIG. 5A. As described before with reference to FIG. 2A, the permission may refer to a kind of parameter that allows the application to collect information (e.g., PII) corresponding to the permission from information stored in the electronic device. In addition, the role of the permission may mean the purpose of use of (or uses of) information collected according to the granting of the permission. For example, the role may be a kind of category as which the permission required by the installation file (or application) is classified. Since a permission and the role of the permission have been described before, a more detailed description thereof will be avoided. An exemplary operation of identifying data called to codes defined as a function of the server 210, and an exemplary operation of identifying the type of a permission and the role of the permission will be further described.

According to various embodiments, the server 210 (e.g., the installation file analysis module 341) may generate (or obtain) a CFG for APIs (e.g., custom APIs) included in an installation file (e.g., the first installation file 510). As described above with reference to FIG. 3C, the CFG may include information about a call relationship between APIs (e.g., custom APIs) included in the installation file (e.g., the first installation file 510), and information about a plurality of OS functions (e.g., OS APIs) and/or end-point functions (e.g., end-point APIs) called by the custom functions. For example, as illustrated in FIG. 5A, the server 210 may obtain a plurality of codes included in the first installation file 510 by decompressing (or de-compiling) the first installation file 510 of the first application, and identify (or obtain) custom APIs 520 (e.g., APIs (a first custom API 520*a* (e.g., Mylocation( . . . )) and a second custom API 520*b* (e.g., Myshare( . . . )) among the plurality of codes. It will be apparent to those skilled in the art that Mylocation and Myshare described as the custom APIs are merely examples for convenience of description, not limiting the custom APIs. The server 210 may generate a CFG based on static analysis of the codes of the custom APIs 520.

The generated CFG may include first information (or a first CFG) representing OS APIs 530 (e.g., Android APIs) called by the custom APIs 520. In an embodiment, the server 210 may identify a specific OS API 530*a* (e.g., GetCurrentlocation( . . . )) called by a custom API 520 (e.g., the first custom API 520*a*) based on identifying a code calling the OS API 530 among the codes of the custom APIs 520, and generate the first CFG representing the identified OS API 530*a*. Further, in an embodiment, the server 210 may identify the specific OS API 530*a* (e.g., GetCurrentlocation( . . . )) corresponding to the specific custom API 520 included in the first installation file 510, based on a pre-implemented electronic document including information about an OS API corresponding to each custom API, and generate the first CFG representing the identified specific OS API 530*a*.

Further, the CFG may include second information (or a second CFG) representing a call relationship (or call flow) between the custom APIs (e.g., the first custom API 520*a* (e.g., Mylocation( . . . )) and the second custom API 520*b* (e.g., Myshare( . . . ))), and end-point APIs 540 corresponding to some of the custom APIs 520. The server 210 may identify at least one other custom API (e.g., the second custom API 520*b* (e.g., Myshare)) sequentially called by the first custom API 520*a* (e.g., Mylocation( . . . )), identify an end-point API 540 (e.g., "Boost::Beast:Write:Http( . . . )" 540*a*) used by the last (or finally) called custom API (e.g., the second custom API 520*b*), and generate the second CFG representing the identified end-point API 540.

According to various embodiments, as at least a part of the operation of identifying the first permission and the role associated with the function, the server 210 (e.g., the installation file analysis module 341) may identify the type of the permission and the role of the permission based on the CFG and the DBs 335 (e.g., the permission DB 335*a* and the category DB 335*c*). For example, the installation file analysis module 341 may identify a permission for the specific custom API 520*a* and the role of the permission. The installation file analysis module 341 may identify the permission for the specific custom API 520*a* and the role of the permission, based on identification of a specific end-point API from a specific Android API in the CFG, or identification of the specific Android API from the specific end-point API in a reverse order. In an embodiment, the installation file analysis module 341 may identify the Android API 530*a* (e.g., Getcurrentlocation( . . . )) corresponding to the specific custom API 520*a* from the CFG, and obtain (or identify) the type (e.g., location) of the permission, corresponding to the identified Android API 530*a* (e.g., GetCurrentlocation( . . . )) among information about the type of a permission for each of the plurality of Android APIs pre-stored in the permission DB 335*a*. The installation file analysis module 341 may identify a level (e.g., API level) corresponding to the identified Android API 530*a* (e.g., Getcurrentlocation( . . . )), and use information about the identified level in the permission DB 335*a* to identify the type of the permission, which will be described later with reference to FIG. 7A. As a result, the server 210 may identify that data of the identified permission type (e.g., location) is obtained (or collected) based on the specific custom API 520*a* (e.g., Mylocation( . . . )). As described above in [Table 1], the permission DB 335*a* may be pre-stored in the server 210 based on analysis of permissions required by Android APIs at each API level based on a known document, and thus a detailed description thereof will be avoided. The installation file analysis module 341 may continue to identify the custom API 520*b* (e.g., Myshare( . . . )) sequentially called by the specific custom API 520*a* (e.g., Mylocation 520*a*), and identify the specific end-point API 540*a* (e.g., "Boost::Beast:Write:Http( . . . )") used by the identified custom API 520*b* (e.g., Myshare( . . . )), on the CFG. The installation file analysis module 341 may obtain (or identify) the role (e.g., transmission) of the permission, corresponding to the identified end-point API 540*a* (boost::beast::http::write( . . . )) among information about the role of a permission for each of the plurality of end-point APIs pre-stored in the category DB 335*c*. Accordingly, the installation file analysis module 341 may identify that data (e.g., sensitive information) of the type (e.g., location) of the permission, collected (or obtained) by the installation file (or application) is processed for the purpose of transmission (that is, transmission to an external device). As described before in [Table 2], the category DB 335*c* may be pre-stored in the server 210 based on analysis of the roles of permissions required by end-point APIs based on a known document, and thus a detailed description thereof will be avoided. As a result, the installation file analysis module 341 may identify that the identified permission (e.g., location) is used for the specific role (e.g., transmission) by the installation file (e.g., a specific custom API of the installation file), as illustrated in FIGS. 6A and 6B. While the server 210 has been described as identifying the OS API 530a to identify the type of a permission and identifying the end-point API 540a to identify the role of the permission in this order with reference to FIG. 5A, the disclosure may not be limited to the described and/or illustrated order. In another embodiment, the server 210 may identify the specific end-point API 540a and then identify the role corresponding to the identified specific end-point API 540a, from the CFG. The server 210 may continue to identify the Android API 530a corresponding to the specific custom API 520a and identify the type of the permission, corresponding to the identified Android API 530a, by reserving from the specific end-point API 540a identified from the CFG.

Like the operation of identifying the type and role of a specific permission based on a specific custom function (e.g., Mylocation( . . . ) 520), the server 210 may identify the type and role of a permission for each of the other custom functions defined as functions included in the first installation file 510. As a result, the server 210 may identify the types of a plurality of permissions, and the roles of the permission types, associated with an installation file to be evaluated.

According to various embodiments, in operation 403, the server 210 may identify a second category of the role associated with the first permission, based on a document associated with the application. For example, the server 210 may obtain an electronic document 550 associated with the installation file (e.g., installation file A) to be evaluated among a plurality of electronic documents 333 stored in the server 210 and/or electronic documents 333 accessible from the server 210. As described before with reference to FIG. 5B, the electronic document 550, which is an electronic document written by the developer d who has developed the application (or program), may be a legal document including a document for a privacy policy, a distribution document associated with the application, or regulations for protecting the privacy and personal information of the user u. The electronic document 440 may include, for example, a GDPR document of the European Union. As illustrated in FIG. 5B, the document analysis module 343 may identify a plurality of texts 551 associated with permissions, included in the electronic document associated with the installation file (e.g., the first installation file 510) to be evaluated, analyze the identified plurality of texts 551 based on the NLP algorithm, and identify information about the permissions (e.g., the types and roles of the permissions) associated with the electronic document based on a result of the analysis. For example, the document analysis module 343 may obtain a first text 551a (e.g., "location information") and a second text 551b (e.g., "collected") associated with the first text 551a as keywords from the plurality of texts 551. The document analysis module 343 may process the first text 551a and the second text 551b as identified keywords (e.g., into matrix values), and obtain a permission type (e.g., location) corresponding to the first text 551a and a role (e.g., "collection") corresponding to the second text 551b in response to input of the processed data to an NLP module 553 (e.g., the artificial intelligence model described before).

Like the operation of identifying the type and role of a specific permission based on the plurality of texts 551 described above with reference to FIG. 5A, the server 210 may identify various types of permissions and the roles of the permissions based on the remaining texts in the electronic document in addition to the identified type and role of the specific permission. As a result, the server 210 may identify a plurality of types of permissions and the roles of the respective permission types, associated with the electronic document.

According to various embodiments, in case the first category and the second category are different, the server 210 may provide a notification in operation 405. For example, as illustrated in FIGS. 6A and 6B, the server 210 (e.g., the permission evaluation module 345) may obtain information 600 including information about the permissions (e.g., the types and roles of the permissions) analyzed from the installation file and information about the permissions (e.g., the types and roles of the permissions) analyzed from the electronic document, and compare the roles on a permission type basis. The server 210 may determine whether the roles are identical for each same permission type identified from the installation file and the electronic document. For example, the server 210 may determine whether a first role of a first permission identified based on static analysis of the installation file (e.g., the first installation file 510) is identical to a second role of the first permission identified based on analysis of the electronic document for the installation file (e.g., the first installation file 510). According to the comparison operation, the server 210 may provide content so that the developer d of the installation file and/or the user u using the installation file may identify how much the role of the permission notified by the electronic document is different from the role of the permission identified according to the result of the static analysis of the installation file. The content may include visual content (e.g., a message, a pop-up screen, or a graphic object), auditory content (e.g., sound), or tactile content (e.g., vibration), and may be provided through the output device 310. For example, as illustrated in FIGS. 6A and 6B, in a case 600a where the roles of a specific permission are different, the server 210 may perform an operation of providing a related notification. An exemplary operation of providing a notification by the server 210 will be described below.

According to various embodiments, the server 210 may obtain various types of information indicating the comparison result, based on the comparison result. In an embodiment, the server 210 may identify permission types having the same roles and permission types having different roles among permission types identified from the installation file and the electronic document, based on the comparison result. Further, in an embodiment, the server 210 may identify the number of the permission types having different roles based on the comparison result, and obtain a risk level for the installation file based on the identified number. For example, the risk level may be set to be high in proportion to the identified number of the permission types having different roles. Accordingly, a higher risk level may indicate a larger difference between the roles of permissions notified by the electronic document and the roles of the permissions in the installation file increases, and a higher risk. Alternatively, the risk level may be set to be inversely proportional to the number of the permission types having different roles, not limited to the description.

According to various embodiments, the server 210 may provide notifications 610a and 610b to the developer d based on the information obtained based on the comparison result, using the output device 310 of the server 210, as illustrated in FIG. 6A. For example, the server 210 may display text 610a indicating the types of permissions having different roles on the display 313 or may output a voice 610b indicating the types of permissions having different roles through the speaker 315. In this case, the server 210 may also provide information about the type of the document (e.g., a document written by the developer d or a legal document) including information about the permissions having different roles (e.g., as text or sound). The server 210 may also provide information about the permissions having the same roles, not limited to the description and/or the illustration. Further, for example, the server 210 may display the text 610b indicating the risk level for the installation file on the display 313 or output the voice 610b indicating the risk level for the installation file through the speaker 315.

According to various embodiments, the server 210 may provide a notification to the user device 220, using the output device 310 of the server 210, based on the information obtained based on the comparison result, as illustrated in FIG. 6B. For example, the server 210 may transmit a screen including information about a plurality of applications and information about results of comparisons of roles corresponding to the plurality of applications (e.g., at least one of information about permission types having different roles and/or the same roles, or a risk level) to the user device 220. As the transmitted screen is displayed on the user device 220, the user u may identify information indicating the comparison result of roles for each application. For example, the user device 220 may display a screen 610 including a text input field 611 for receiving a search query, based on executing an application (e.g., an app search application) for application installation and/or search. In case text (e.g., "game") is entered in the text input field 611, the user device 220 may transmit a search query including the text to the server 210. In this case, the search query may further include instructions causing evaluation of permissions for detected applications (e.g., evaluation of the roles of the permissions). The server 210 may detect applications 613, 615, and 617 corresponding to the search query, and perform a permission evaluation operation (e.g., operations 401, 403, and 405 described before) on installation files and electronic documents corresponding to the detected applications 613, 615, and 617. The server 210 may transmit a screen including information (e.g., installation links) about the detected applications 613, 615, and 617 and result information for the detected applications 613, 615, and 617 obtained based on the evaluation operation (e.g., operations 401, 403, and 405 described before) to the user device 220 through the communication circuit 311. The screen 610 may be displayed on the display of the user device 220, and the user u may identify the result of the permission evaluation for each of the detected applications 613, 615, and 617. For example, referring to FIG. 6B, the screen 610 may include risk level information 621, 623, and 625 for the respective applications 613, 615, and 617. Further, for example, while not shown, the screen 610 may include information about permissions having roles different from those in an electronic document, for each of the applications 613, 615, and 617. In addition, the user device 220 may request permission evaluation for an application after installation of the application, receive a screen including result information from the server 210, and display the received screen.

An exemplary operation of the server 210 according to various embodiments will be described below. As described above, in case the user device 220 is implemented as an on-device type, the operations of the server 210 described below may be performed in the user device 220, or in case the user device 220 and the server are implemented as a hybrid type, some of the operations of the server 210 described below may be performed in the server 210, and the other operations of the server 210 may be performed in the user device 220. Because the description of the above-described operation of the server 210 (e.g., the operation illustrated in the flowchart 400 of FIG. 4) may be applied adaptively to the following description, and thus a redundant description will be avoided.

According to various embodiments, the server 210 may identify a permission and the role of the permission according to a level (e.g., API level) (or an OS version (e.g., Android version)) associated with an OS API (e.g., Android API) called by data (or code) (e.g., a custom API) defined as a function included in an installation file.

Figure 7A:
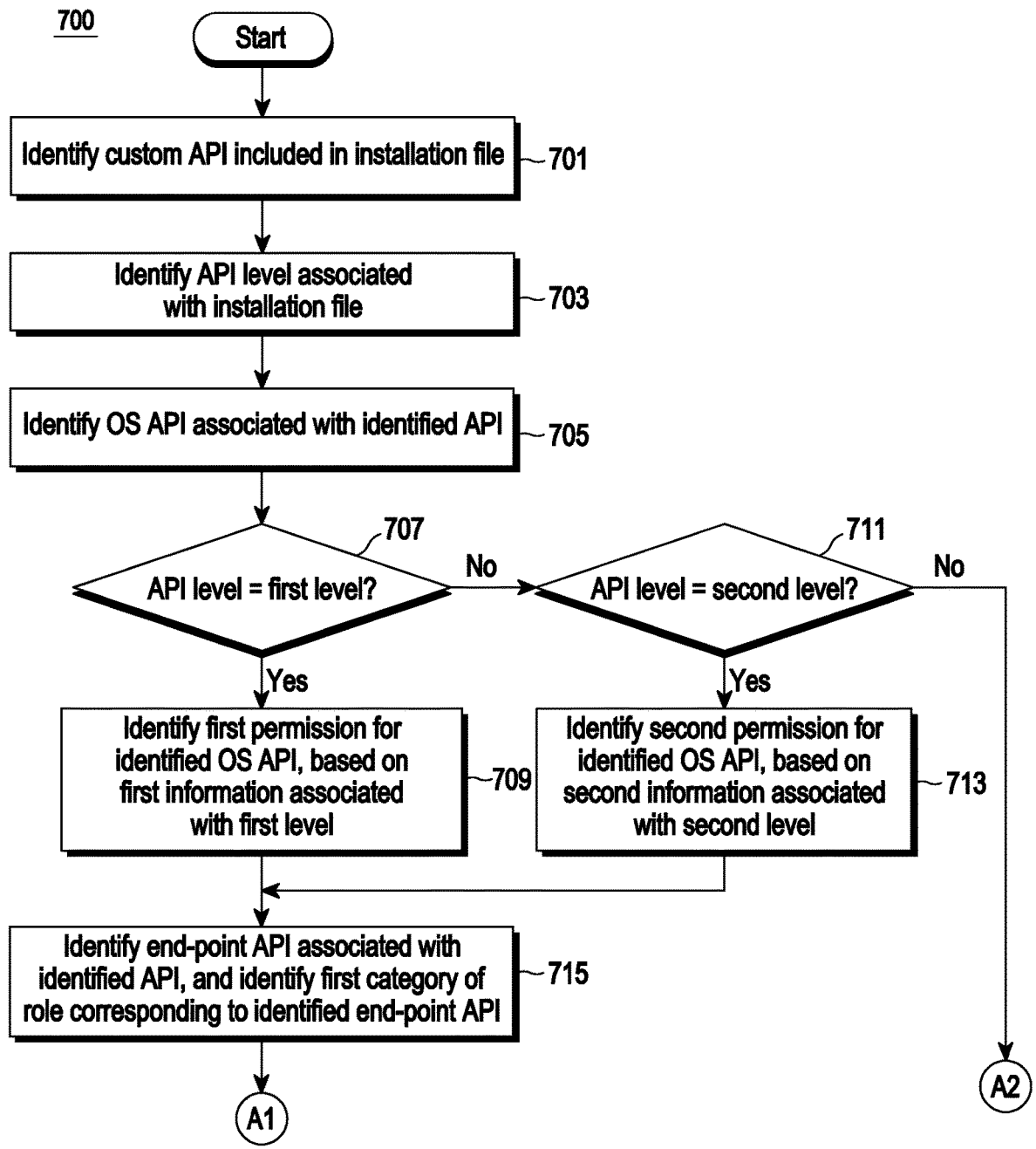
FIG. 7A is a first part of a flowchart illustrating an exemplary operation of a server according to various embodiments of the disclosure.
Figure 7B:
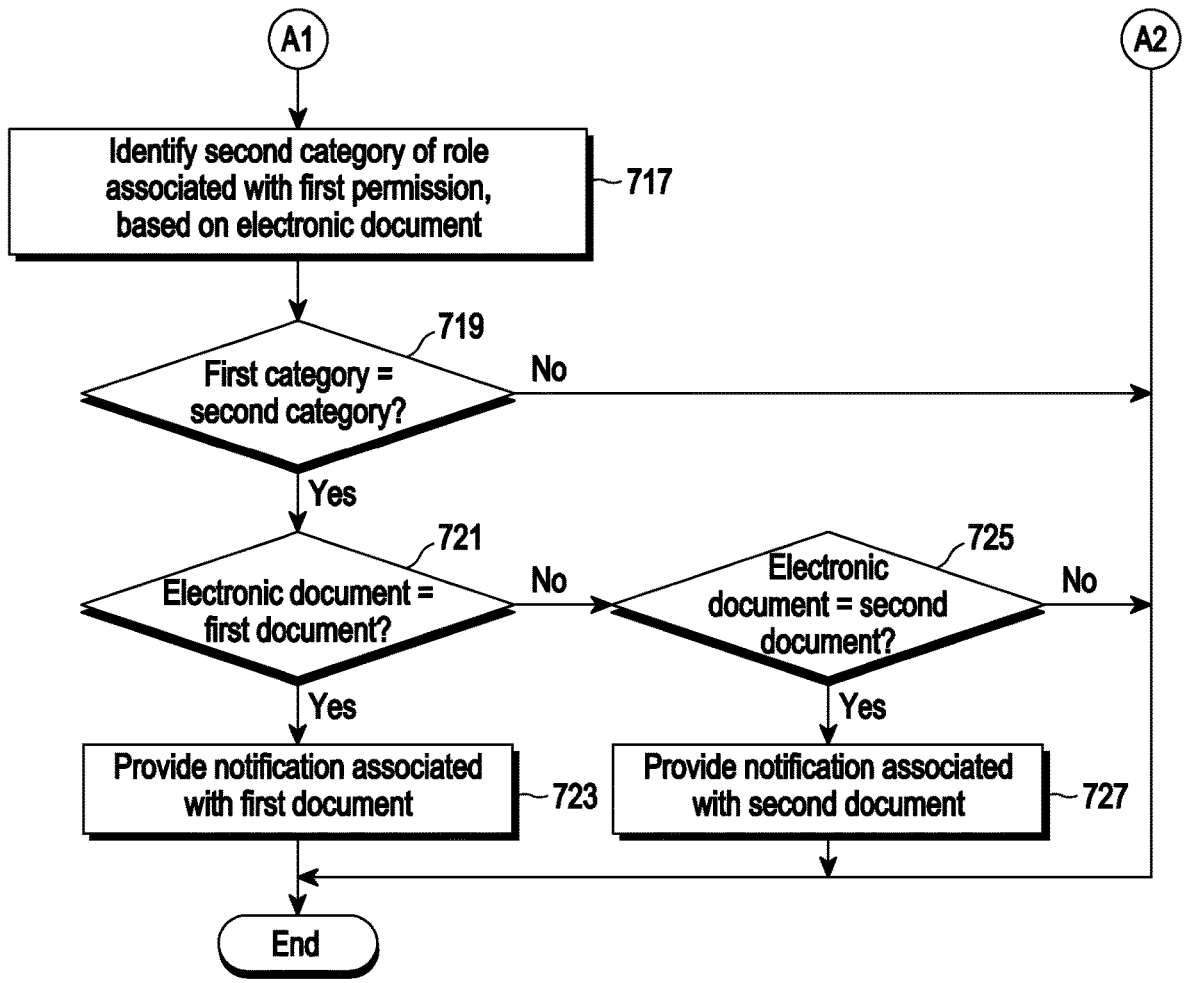
FIG. 7B is a second part of a flowchart illustrating an exemplary operation of a server according to various embodiments of the disclosure.

FIG. 7A is a first part of a flowchart 700 describing an exemplary operation of the server 210 according to various embodiments of the disclosure. FIG. 7B is a second part of a flowchart 700 describing an exemplary operation of the server 210 according to various embodiments of the disclosure. The operations illustrated in FIGS. 7A and 7B may be performed in various orders, not limited to the illustrated order. Further, according to various embodiments, more operations than those illustrated in FIGS. 7A and 7B or at least one operation fewer than those illustrated in FIGS. 7A and 7B may be performed. FIGS. 7A and 7B will be described below with reference to FIG. 7C.

Figure 7C:
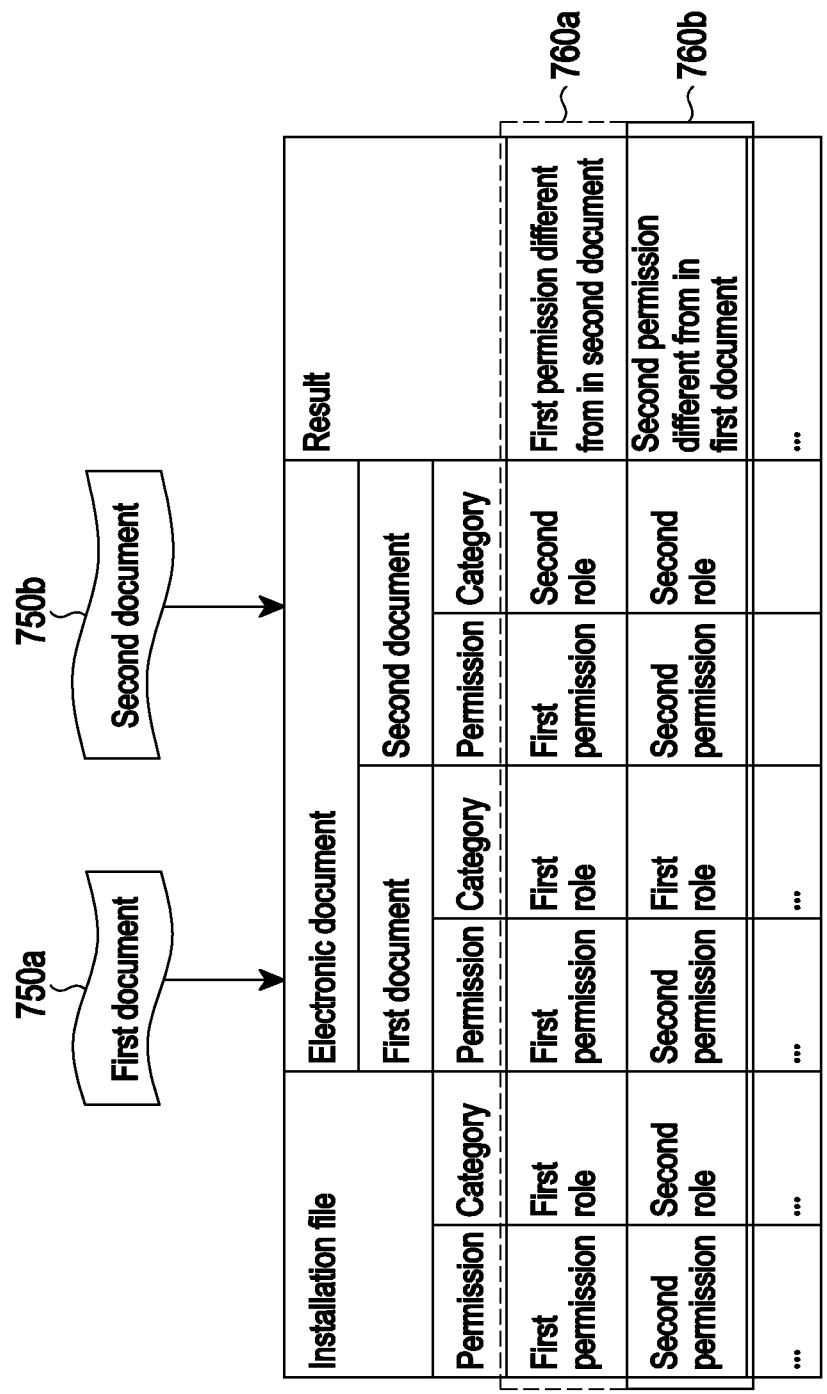
FIG. 7C is a diagram illustrating an exemplary operation of comparing a role of a permission, identified based on an installation file with the role of the permission, identified based on each of electronic documents, and providing a notification based on a result of the comparison in a server according to various embodiments of the disclosure.

FIG. 7C is a diagram illustrating an exemplary operation of comparing the roles of permissions identified based on an installation file with the roles of the permissions identified in each of electronic documents, and providing a notification based on a result of the comparison in the server 210 according to various embodiments of the disclosure.

According to various embodiments, the server 210 may identify an API level associated with an installation file in operation 701. For example, the server 210 may identify the API level associated with the installation file. As described before with reference to FIG. 2, an installation file may be generated (or configured) based on an SDK corresponding to a specific API level, and the generated installation file may include a plurality of custom APIs that perform functions in an Android version corresponding to the specific API level.

According to various embodiments, the server 210 may identify a custom API included in the installation file in operation 703, and identify an OS API associated with the identified custom API in operation 705. For example, the server 210 may identify a CFG for the installation file, and identify an Android API called by a specific custom API based on the CFG. Since the operation of identifying an Android API in the server 210 has been described with reference to FIG. 5A, a redundant description will be avoided.

According to various embodiments, the server 210 may determine whether the identified API level is a first level in operation 707, and in case the API level is the first level, the server 210 may identify a first permission for the identified OS API based on first information associated with the first level in operation 709. Further, in case the identified API level is not the first level, the server 210 may determine whether the identified API level is a second level in operation 711 and identify a second permission for the identified OS API based on second information associated with the second level in operation 713. For example, the server 210 may identify the type of the permission corresponding to the Android API based on information corresponding to the identified API level in the permission DB 335a. As described above, the permission DB 335a may include information about the types of permissions corresponding to Android APIs for each of a plurality of API levels. The server 210 may identify the type of the permission corresponding to the identified Android API from information corresponding to the identified API level (e.g., the first level or the second level) among a plurality of APIs. Since the operation of identifying the type of a permission corresponding to an Android API in the server 210 has been described with reference to FIG. 5A, a more detailed description thereof will be avoided.

According to various embodiments, the server 210 may identify an end-point API associated with the identified API and identify a first category of a role corresponding to the identified end-point API in operation 715. For example, the server 210 may identify an end-point API corresponding to a specific custom API from the CFG, and identify the role of a permission corresponding to the identified end-point API based on the category DB 335c. Since the operation of identifying an end-point API and identifying the role of a permission corresponding to the end-point API has been described with reference to FIG. 5A, a more detailed description thereof will be avoided.

According to various embodiments, the server 210 may identify a second category of the role associated with the first permission, based on an electronic document in operation 717. For example, the server 210 may identify the role of a specific permission in each of a plurality of electronic documents (e.g., a first document 750a and a second document 750b). For example, the server 210 may identify the role of the first permission in each of the plurality of electronic documents (e.g., the first document 750a and the second document 750b) based on a natural language understanding algorithm, as illustrated in FIG. 7C. For example, the server 210 may identify a first role for the first permission and the first role for the second permission based on the first document 750a (e.g., a legal document such as GDPR). Further, for example, the server 210 may identify the second role for the first permission and the second role for the second permission based on the second document 750b (e.g., an application manual). Since the operation of identifying a permission and the role of the permission from an electronic document in the server 210 has been described with reference to FIG. 5B, a more detailed description thereof will be avoided.

According to various embodiments, the server 210 may determine whether the first category and the second category correspond to each other in operation 719. For example, the server 210 may compare the role of a specific permission identified based on the installation file with the role of the specific permission identified based on an electronic document. Referring to FIG. 7C, the server 210 may compare the role (e.g., the first role and/or the second role) of a specific permission (e.g., the first permission and/or the second permission) identified based on the installation file with the role (e.g., the first role and/or the second role) of the specific permission (e.g., the first permission and/or the second permission) identified in each of the electronic documents (e.g., the first document 750a and the second document 750b). Since the operation of comparing roles of a permission in the server 210 has been described before with reference to FIGS. 6A and 6B, a more detailed description will be avoided.

According to various embodiments, in case the first category does not correspond to the second category, the server 210 may determine whether the electronic document is a first document in operation 721, and in case the electronic document is the first document, may provide a notification associated with the first document in operation 723. Further, in case the electronic document is not the first document, the server 210 may determine whether the electronic document is a second document in operation 725, and in case the electronic document is the second document, may provide a notification associated with the second document in operation 727. For example, as illustrated in FIG. 7C, the server 210 may identify the type of a document corresponding to a role different from the role of a specific permission in the installation file, and provide a notification of the identified type of the document. For example, as illustrated in 760a of FIG. 7C, the server 210 may identify the second document corresponding to a role different from the first role of the first permission, and provide a notification indicating that the first role of the first permission is different from in the identified second document (e.g., the second document describes a role different from the role of the permission notified by the application manual). Further, for example, the server 210 may identify the first document describing a role different from the second role of the second permission as illustrated in 760b of FIG. 7C, and provide a notification indicating that the second role of the second permission is different from in the identified first document (e.g., a role of the permission notified by a legal document). The server 210 may also provide a notification indicating role mismatch with respect to a plurality of documents rather than a single document, not limited to the illustration and/or the description.

An exemplary operation of the server 210 according to various embodiments will be described. As described above, in case the user device 220 is implemented as an on-device type, the operations of the server 210 described below may be performed in the user device 220, or in case the user device 220 and the server are implemented as a hybrid type, some of the operations of the server 210 described below may be performed in the server 210, and the other operations of the server 210 may be performed in the user device 220. Because the description of the above-described operation of the server 210 (e.g., the operation of the flowchart 400 of FIG. 4 and the operations of the flowcharts 700 of FIGS. 7A and 7B) may be applied adaptively to the following description, and thus a redundant description will be avoided.

According to various embodiments, the server 210 may identify an end-point API from a CFG for an installation file, and identify the role of a permission for the identified end-point API. The server 210 may identify a plurality of Android APIs corresponding to the end-point API by reversing (e.g., reversing a call order) from the end-point API, and identify the types of permissions corresponding to the plurality of Android APIs. Accordingly, the server 210 may identify the types of permissions with which data is processed for the role identified based on the installation file.

Figure 8:
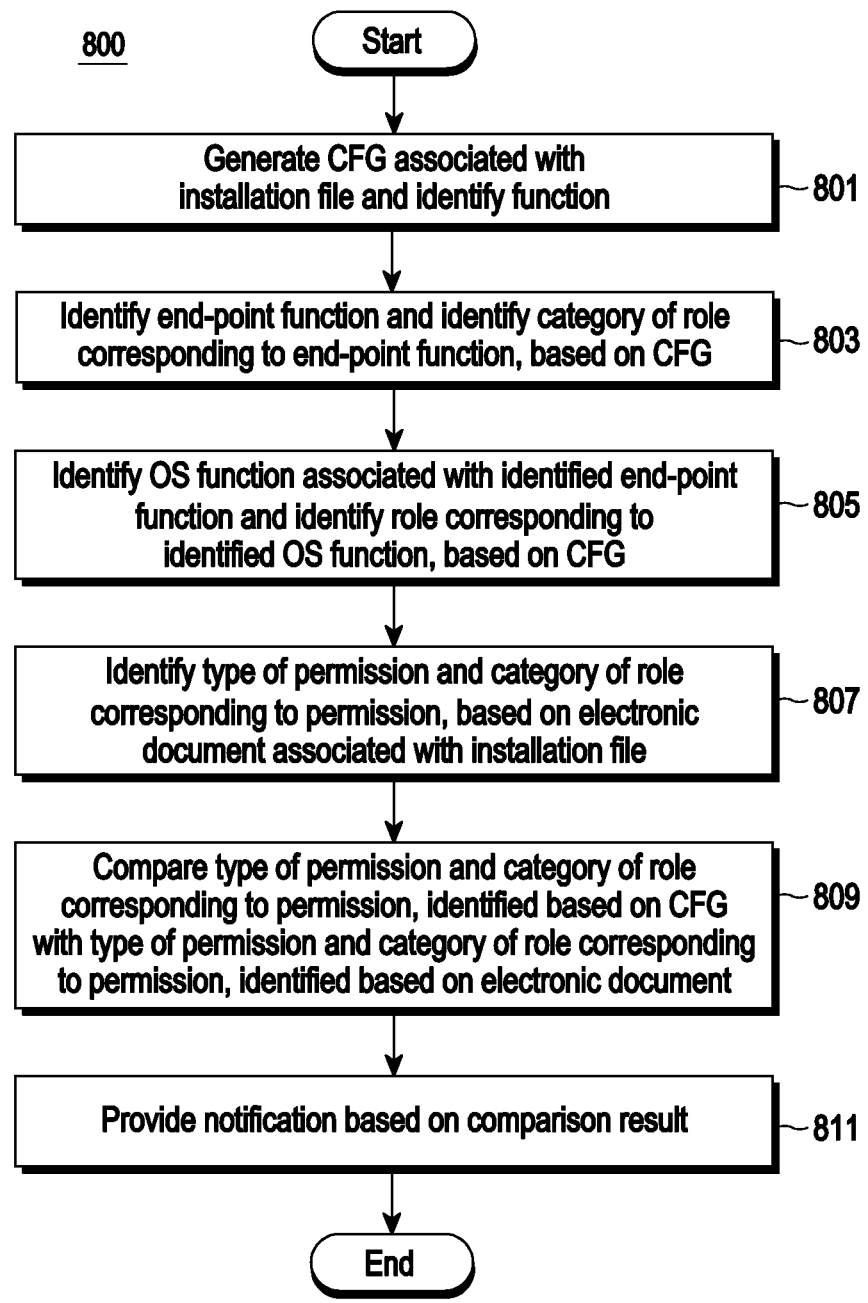
FIG. 8 is a flowchart illustrating an exemplary operation of a server according to various embodiments of the disclosure.

FIG. 8 is a flowchart 800 illustrating an exemplary operation in the server 210 according to various embodiments of the disclosure. The operations illustrated in FIG. 8 may be performed in various orders, not limited to the illustrated order. Further, according to various embodiments, more operations than those illustrated in FIG. 8 or at least one operation fewer than those illustrated in FIG. 8 may be performed. FIG. 8 will be described below with reference to FIGS. 9A and 9B.

Figure 9A:
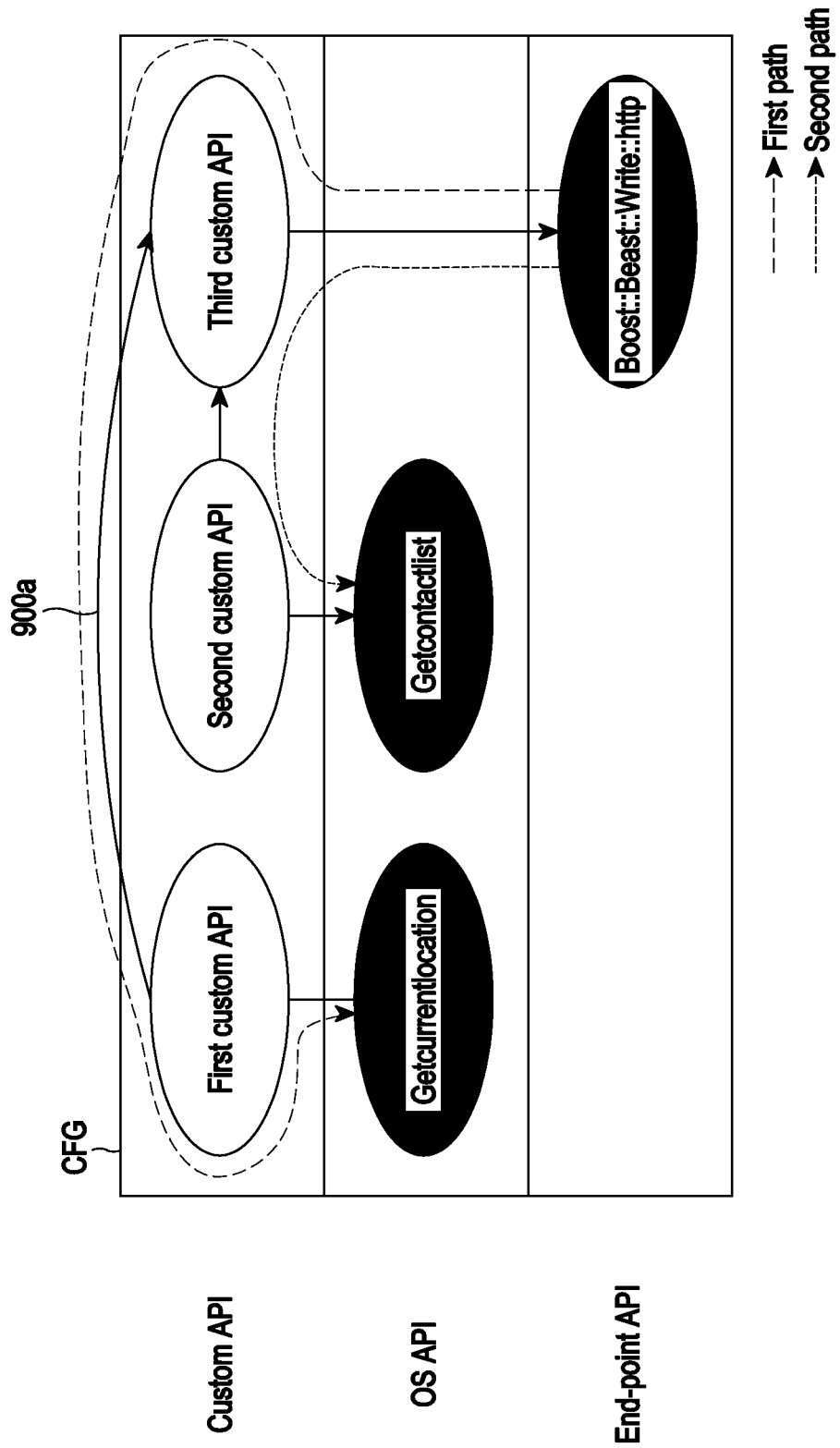
FIG. 9A is a diagram illustrating an exemplary operation of identifying a plurality of Android application programming interfaces (APIs) by reversing (e.g., reversing a call order) from the end-point API, based on a call flow graph in a server according to various embodiments of the disclosure.
Figure 9B:
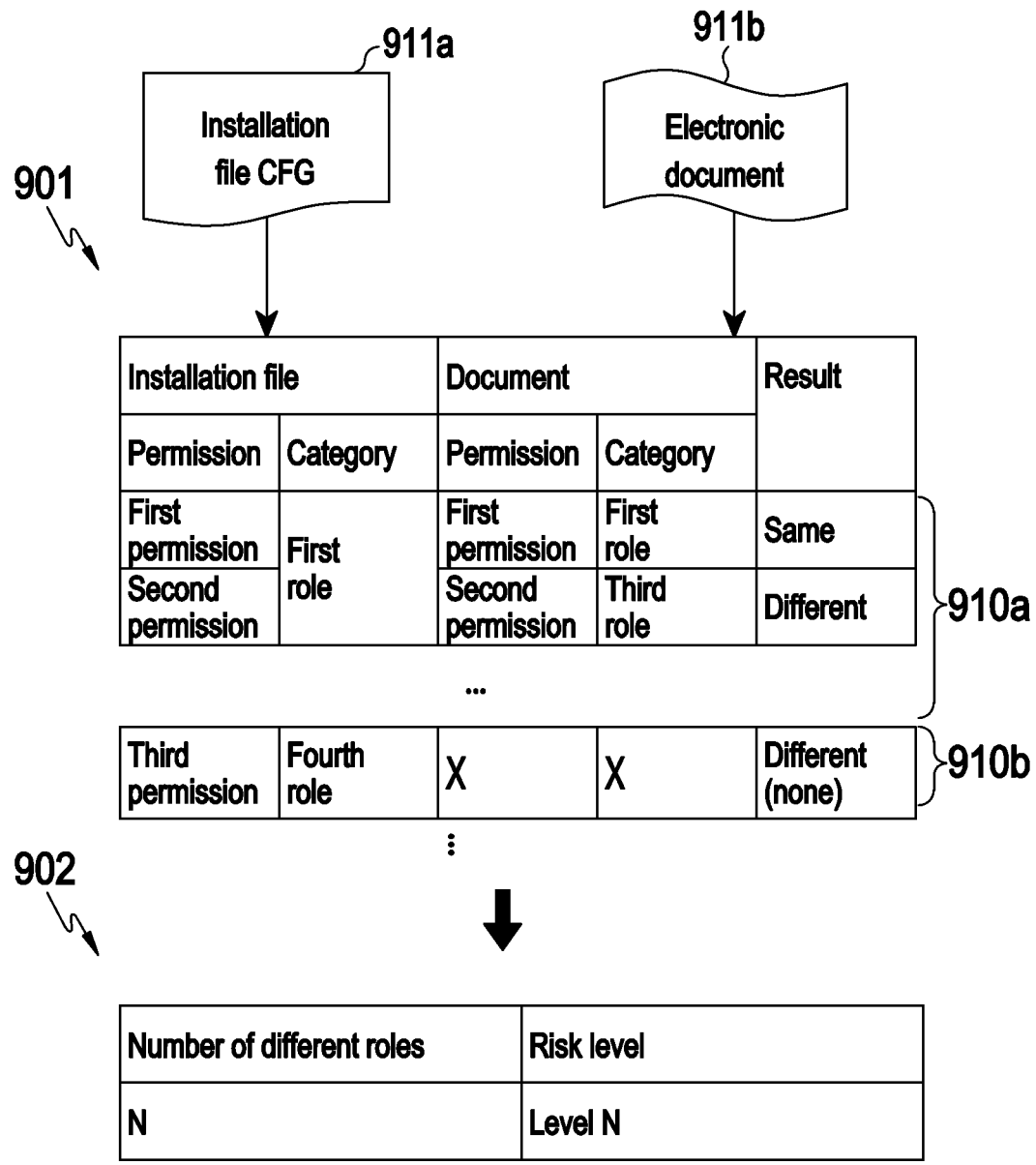
FIG. 9B is a diagram illustrating an exemplary operation of comparing a role of each permission type, identified based on a call flow graph with the role of the permission type, identified based on an electronic document in a server according to various embodiments of the disclosure.

FIG. 9A is a diagram illustrating a plurality of Android APIs corresponding to an end-point API by reversing (e.g., reversing a call order) from the end-point API based on a CFG in the server 210 according to various embodiments of the disclosure. FIG. 9B is a diagram illustrating an exemplary operation of comparing the role of each permission type, identified based on a CFG with the role of the permission type, identified based on an electronic document according to various embodiments of the disclosure.

According to various embodiments, the server 210 may generate a CFG associated with an installation file in operation 801. For example, as illustrated in FIG. 9A, the server 210 may generate the CFG based on static analysis of the installation file. As described above, the CFG may include information about a call relationship (or call flow) between a plurality of custom functions (e.g., custom APIs) included in the installation file, and information about OS functions and/or end-point functions called by the plurality of custom functions. For example, the CFG may include information indicating that a first custom API calls a third custom API and consequently uses a specific end-point API (e.g., Boost::Beast::Write::Http), and information indicating that the first custom API calls a first Android API (e.g., getcurrentlocation( . . . )). Further, for example, the CFG may include information indicating that a second custom API calls the third custom API and consequently uses the specific end-point API (e.g. Boost::Beast::Write::Http), and information indicating that the second custom API calls a second Android API (e.g., getcontactlist( . . . )).

According to various embodiments, the server 210 may identify an end-point function based on the CFG and identify a category of a role corresponding to the end-point function in operation 803. For example, referring to FIG. 9A, the server 210 may identify a specific end-point API (e.g., Boost::Beast::Write::Http) from the CFG, and identify a role "transmission" corresponding to the specific end-point API (e.g., Boost::Beast::Write::Http) based on the category DB 335c.

According to various embodiments, the server 210 may identify an OS function associated with the identified end-point function based on the CFG, and identify a permission corresponding to the identified OS function in operation 805. For example, referring to FIG. 9A, the server 210 may identify custom APIs calling the specific end-point API (e.g., Boost::Beast::Write::Http) by reversing along paths (e.g., a first path 900a and a second path 900b) and identify OS APIs based on the identification. For example, the server 210 may identify custom APIs (e.g., the third custom API) that call the specific end-point API (e.g., Boost::Beast::Write::Http), and identify the first custom API calling the identified third custom API along the first path 900a and the second custom API calling the third custom API along the second path 900b. As a result, the server 210 may identify a plurality of Android APIs (e.g., the first Android API (Getcurrentlocation) and the second Android API (Getcontactlist)) called by some of the identified custom APIs (e.g., the first custom API and the second custom API). As illustrated in FIG. 9B, the server 210 may identify a first permission (e.g., location) and a second permission (e.g., contact) corresponding to the identified plurality of respective Android APIs. Accordingly, the server 210 may identify that data corresponding to a location and data corresponding to a contact are transmitted to an external device based on the installation file (or application).

According to various embodiments, in operation 807, the server 210 may identify the type of a permission and a category of a role corresponding to the permission based on an electronic document associated with the installation file. For example, the server 210 may identify the type of the permission (e.g., the first permission (e.g., location) and/or the second permission (e.g., contact))) and the role corresponding to the permission (e.g., a first role and/or a third role) based on analysis of an electronic document 911b associated with the installation file.

According to various embodiments, in operation 809, the server 210 may compare the type of the permission and the category of the role corresponding to the permission, identified based on the CFG with the type of the permission and the category of the role corresponding to the permission, identified based on the electronic document in operation 809. For example, as illustrated in 901 of FIG. 9B, the server 210 may determine a category of the role of a specific permission, identified from a CFG 911a with a category of the role of the specific permission, identified from the electronic document 911b. In an embodiment, the server 210 may determine whether the role of data in the specific permission notified by the electronic document 911b is identical to the role of data in the specific permission identified from the CFG 911a, based on a result of the comparison, as illustrated in 910a of FIG. 9B. For example, the server 210 may compare the role (e.g., the first role) of data in the first permission (e.g., location), identified from the call-graph 911a with the role (e.g., the first role) of data in the first permission (e.g., location), identified from the electronic document 911b, and identify that the roles are identical based on a result of the comparison. Further, for example, the server 210 may compare the role (e.g., the first role) of data in the second permission (e.g., contact) identified from the CFG 911a with the role (e.g., the third role) of data in the second permission (e.g., contact), identified from the electronic document 911b, and identify that the roles are different based on a result of the comparison. Further, in an embodiment, the server 210 may identify that the role of a third permission identified from the CFG 911a has not been obtained from the electronic document 911b, as illustrated in 910b of FIG. 9B.

According to various embodiments, the server 210 may provide a notification based on the comparison result in operation 811. For example, as illustrated in 902 of FIG. 9A, the server 210 may identify the number of permissions identified based on the installation file, which have different roles from those of the permissions in the electronic document 911b or which have not been identified in the electronic document 911b, and provide a notification of a risk level (level N) based on the identified number N. As described before, the risk level may be set in proportion to the number N, or the risk level may be set in inverse proportion to the number N. Further, for example, the server 210 may provide a notification about the permissions which have roles different from those of the permissions identified from the electronic document 911b or which have not been identified from the electronic document 911b.

An exemplary operation of the user device 220 according to various embodiments will be described below.

According to various embodiments, the user device 220 may compare a role of a permission, identified as a result of static analysis of an installation file received from the server 210 with the role of the permission, identified from an electronic document for the installation file. The user device 220 may provide a notification based on a result of the comparison.

Figure 10:
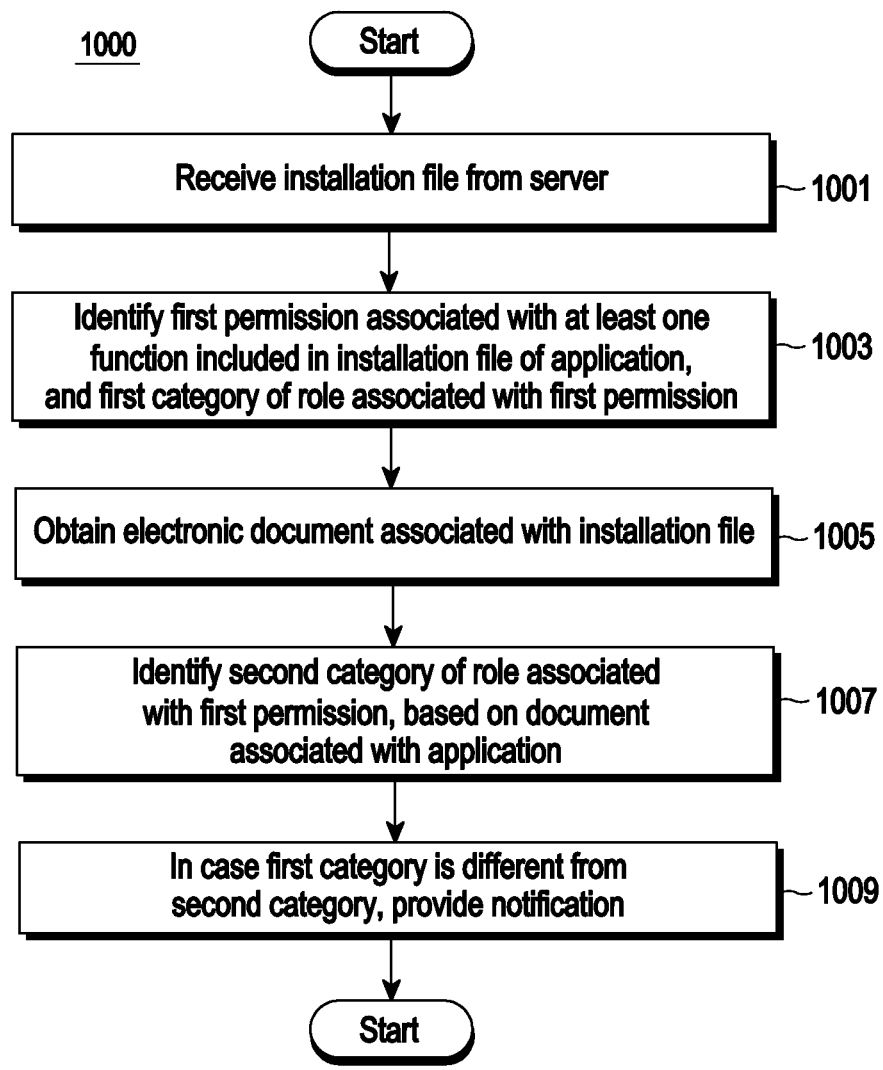
FIG. 10 is a flowchart illustrating an exemplary operation of a user device according to various embodiments of the disclosure.

FIG. 10 is a flowchart 1000 illustrating an exemplary operation of the user device 220 according to various embodiments of the disclosure. The operations illustrated in FIG. 10 may be performed in various orders, not limited to the illustrated order. Further, according to various embodiments, more operations than those illustrated in FIG. 10 or at least one operation fewer than those illustrated in FIG. 10 may be performed.

According to various embodiments, the user device 220 may receive an installation file from the server 210 in operation 1001. For example, the user device 220 may access the server 210 and download (or receive) the installation file registered in the server 210. The user device 220 may access the server 210 based on execution of a search application for downloading an application (or program). The user device 220 may transmit a search query for application search to the server 210 based on the search application, and receive a screen for search results of applications corresponding to the search query from the server 210. The search result screen may include a list of a plurality of installation files corresponding to a plurality of applications. The user device 220 may obtain at least one installation file from among the plurality of installation files from the server 210.

According to various embodiments, based on occurrence of a specified event, the user device 220 may perform operations 1003 and 1005 for comparing the role of the permission, identified based on the installation file installed in the user device 220 with the role of the permission, identified from the electronic document for the installation file. In an embodiment, the specified event may occur based on an application (or program) implemented for permission evaluation. For example, the user device 220 may store an evaluation application (or program) for evaluating the permissions of the installation file (or application) installed in the user device 220. The evaluation application may be implemented to include the afore-described installation file analysis module 341, document analysis module 343, and permission evaluation module 345. The user device 220 may perform operations 1003 and 1005 on the installation file stored in the user device 220 based on the execution of the evaluation application. Further, in an embodiment, the specific event may occur by downloading the installation file. For example, in case the specific installation file is downloaded on the search result screen, the user device 220 may perform operations 1003 and 1005 for the downloaded specific installation file.

According to various embodiments, in operation 1003, the user device 220 may identify a first permission associated with at least one function included in the installation file and a first category of a role associated with the first permission. For example, the user device 220 may generate a CFG by statically analyzing the installation file, and identify an OS API and an end-point API for a custom API from the generated CFG. The user device 220 may identify a type of the permission corresponding to the OS API, and identify the role of the permission corresponding to the end-point API. Since operation 1003 of the user device 220 may be performed in the same manner as operation 401 of the server 210 described above, a detailed description thereof will be avoided.

According to various embodiments, the user device 220 may identify a role corresponding to the type of the permission based on the installed installation file. For example, the user device 220 may request a permission to collect sensitive information based on the installation file. In case a permission of a specific type is allowed according to the request, the user device 220 may identify an OS API corresponding to the permission of the specific type, identify an end-point API corresponding to the role of the permission of the specific type, and thus identify the role corresponding to the end-point API, which should not be construed as limiting.

According to various embodiments, the user device 220 may obtain an electronic document associated with the installation file in operation 1005, and identify a second category of the role associated with the first permission, based on the electronic document in operation 1007. In an embodiment, the user device 220 may receive the electronic document associated with the installation file from an external device. For example, the user device 220 may access the server 210 in which the installation file is registered, and obtain the electronic document for the installation file registered in the server 210. Further, for example, the user device 220 may receive a legal document from a server that stores the legal document. Further, in an embodiment, the user device 220 may obtain an electronic document included in the installation file. For example, the server 210 may include the electronic document associated with the installation file in the installation file. Accordingly, the installation file stored in the user device 220 may include the electronic document. The user device 220 may identify a type of the permission and a role of the permission notified by the obtained electronic document based on analysis of the electronic document. Since operation 1007 of the user device 220 may be performed in the same manner as operation 403 of the server 210, a detailed description thereof will be avoided.

According to various embodiments, in case the first category and the second category are different from each other, the user device 220 may provide a notification in operation 1009. For example, the user device 220 may compare roles for each of obtained permission types, and may provide information about permissions having different roles by a notification based on a result of the comparison. Since operation 1009 of the user device 220 may be performed in the same manner as operation 405 of the server 210, a detailed description thereof will be avoided.

According to various embodiments, a method performed by an electronic device may include identifying a first permission associated with a function included in an installation file of an application, and a first category of a role associated with the first permission, identifying a second category of the role associated with the first permission, based on a document associated with the application, and in case the first category is different from the second category, providing a notification.

According to various embodiments, the function may be an API.

According to various embodiments, the method may include generating a call flow graph for the installation file, and identifying the first permission associated with the function and the first category of the role, based on the call flow graph.

According to various embodiments, the call flow graph may include at least one of information about at least one other function associated with the function, included in the installation file, a first function associated with an OS of the electronic device, the first function being associated with the function, or a second function configured to process data obtained by the first function.

According to various embodiments, the method may include identifying the second function configured to process the data, based on the call flow graph, identifying a third function calling the identified second function among the function and the at least one other function included in the installation file, based on the call flow graph, identifying the function calling the third function, based on the call flow graph, and identifying the first function associated with the OS, corresponding to the identified function.

According to various embodiments, the method may include identifying the first permission corresponding to the identified first function, based on first information about a plurality of permissions respectively corresponding to a plurality of first functions associated with the OS stored in a memory of the electronic device, and identifying the first category of the role corresponding to the identified second function, based on second information about a plurality of categories for the role respectively corresponding to a plurality of second functions associated with a plurality of libraries stored in the memory.

According to various embodiments, the method may include identifying a level of the function, and identifying the first permission corresponding to the first function and the identified level, based on the first information stored in the memory.

According to various embodiments, the document associated with the application may include a plurality of texts associated with the application.

According to various embodiments, the method may include identifying the second category of the role associated with the first permission from the plurality of texts, based on natural language processing (NLP).

According to various embodiments, the notification may be about the first permission, and the notification may include content indicating that the installation file processes data of the first permission for a role different from a role in the document.

According to various embodiments, the notification may include information about a type of the document, and the type of the document may include at least one of a first document for the application, registered in the electronic device or a second document that is a legal document.

According to various embodiments, the method may include comparing a category of a role of each of a plurality of permissions, identified based on the installation file with a category of the role of each of the plurality of permissions, identified based on the document, identifying a number of permissions having different categories of the role, based on a result of the comparison, and providing information about a risk level corresponding to the identified number.

According to various embodiments, the method may include receiving a search query from an external electronic device, identifying the installation file corresponding to the received search query, and providing information about the installation file and the notification to the external electronic device.

According to various embodiments, an electronic device may include a memory and at least one processor. The at least one processor may be configured to identify a first permission associated with a function included in an installation file of an application, and a first category of a role associated with the first permission, identify a second category of a role associated with the first permission, based on a document associated with the application, and in case the first category is different from the second category, provide a notification.

According to various embodiments, the function may be an API.

According to various embodiments, the at least one processor may be configured to generate a call flow graph for the installation file, and identify the first permission associated with the function and the first category of the role, based on the call flow graph.

According to various embodiments, the call flow graph may include at least one of information about at least one other function associated with the function, included in the installation file, a first function associated with an OS of the electronic device, the first function being associated with the function, or a second function configured to process data obtained by the first function.

According to various embodiments, the at least one processor may be configured to identify the second function configured to process the data, based on the call flow graph, identify a third function calling the identified second function among the function and the at least one other function included in the installation file, based on the call flow graph, identify the function calling the third function, based on the call flow graph, and identify the first function associated with the OS, corresponding to the identified function.

According to various embodiments, the at least one processor may be configured to identify the first permission respectively corresponding to the identified first function, based on first information about a plurality of permissions corresponding to a plurality of first functions associated with the OS stored in the memory, and identify the first category of the role corresponding to the identified second function, based on second information about a plurality of categories for the role respectively corresponding to a plurality of second functions associated with a plurality of libraries stored in the memory.

According to various embodiments, a method performed by an electronic device may include receiving an installation file of an application from a server, identifying a first permission associated with a function included in the installation file, and a first category of a role associated with the first permission, obtaining a document associated with the application from the server, identifying a second category of the role associated with the first permission, based on the document, and in case the first category is different from the second category, providing a notification.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating an electronic device, comprising:
   identifying a first permission associated with a function included in an installation file of an application, and a first category of a role associated with the first permission;
   identifying a second category of the role associated with the first permission, based on a document associated with a policy for the application;
   identifying the first permission corresponding to a first function associated with the function and an operating system (OS) of the electronic device, based on first information about a plurality of permissions respectively corresponding to a plurality of first functions associated with the OS stored in a memory of the electronic device; and
   identifying the first category of the role corresponding to a second function configured to process data obtained by the first function, based on second information about a plurality of categories for the role respectively corresponding to a plurality of second functions associated with a plurality of libraries stored in the memory; and
   based on the first category being different from the second category, providing a notification indicating that the first category is different from the second category.

2. The method of claim 1, wherein the function is an application programming interface (API).

3. The method of claim 1, further comprising:
generating a call flow graph for the installation file; and
identifying the first permission associated with the function and the first category of the role, based on the call flow graph.

4. The method of claim 3, wherein the call flow graph includes at least one of:
information about at least one other function associated with the function, included in the installation file,
the first function, or
the second function.

5. The method of claim 4, further comprising:
identifying the second function configured to process the data, based on the call flow graph;
identifying a third function calling the identified second function among the function and the at least one other function included in the installation file, based on the call flow graph;
identifying the function calling the third function, based on the call flow graph; and
identifying the first function associated with the OS, corresponding to the identified function.

6. The method of claim 5, further comprising:
identifying a level of the function; and
identifying the first permission corresponding to the first function and the identified level, based on the first information stored in the memory.

7. The method of claim 1, wherein the document associated with the application includes a plurality of texts associated with the application.

8. The method of claim 7, further comprising identifying the second category of the role associated with the first permission from the plurality of texts, based on natural language processing (NLP).

9. The method of claim 1,
wherein the notification is about the first permission, and
wherein the notification includes content indicating that the installation file processes data of the first permission for a role different from a role in the document.

10. The method of claim 9, wherein the notification includes information about a type of the document, and the type of the document includes at least one of a first document for the application, registered in the electronic device or a second document that is a legal document.

11. The method of claim 1, further comprising:
comparing a category of a role of each of a plurality of permissions, identified based on the installation file with a category of the role of each of the plurality of permissions, identified based on the document;
identifying a number of permissions having different categories of the role, based on a result of the comparison; and
providing information about a risk level corresponding to the identified number.

12. The method of claim 1, further comprising:
receiving a search query from an external electronic device;
identifying the installation file corresponding to the received search query; and
providing information about the installation file and the notification to the external electronic device.

13. An electronic device comprising:
memory storing instructions; and
at least one processor,
wherein the instructions, when executed by the at least one processor, cause the electronic device to:
identify a first permission associated with a function included in an installation file of an application, and a first category of a role associated with the first permission,
identify a second category of the role associated with the first permission, based on a document associated with a policy for the application,
identify the first permission corresponding to a first function associated with the function and an operating system (OS) of the electronic device, based on first information about a plurality of permissions respectively corresponding to a plurality of first functions associated with the OS stored in a memory of the electronic device; and
identify the first category of the role corresponding to a second function configured to process data obtained by the first function, based on second information about a plurality of categories for the role respectively corresponding to a plurality of second functions associated with a plurality of libraries stored in the memory, and
based on the first category being different from the second category, provide a notification indicating that the first category is different from the second category.

14. The electronic device of claim 13, wherein the function is an application programming interface (API).

15. The electronic device of claim 13, wherein the instructions, when executed by the at least one processor, cause the electronic device to:
generate a call flow graph for the installation file, and
identify the first permission associated with the function and the first category of the role, based on the call flow graph.

16. The electronic device of claim 15, wherein the call flow graph includes at least one of:
information about at least one other function associated with the function, included in the installation file,
the first function, or
the second function.

17. The electronic device of claim 16, wherein the instructions, when executed by the at least one processor, cause the electronic device to:
identify the second function configured to process the data, based on the call flow graph,
identify a third function calling the identified second function among the function and the at least one other function included in the installation file, based on the call flow graph,
identify the function calling the third function, based on the call flow graph, and
identify the first function associated with the OS, corresponding to the identified function.

18. The electronic device of claim 16, wherein the instructions, when executed by the at least one processor, cause the electronic device to:
identify a level of the function, and
identify the first permission corresponding to the first function and the identified level, based on the first information stored in the memory.

* * * * *